United States Patent
Marom et al.

(10) Patent No.: US 11,301,811 B2
(45) Date of Patent: Apr. 12, 2022

(54) DIGITAL PROCESSING SYSTEMS AND METHODS FOR SELF-MONITORING SOFTWARE RECOMMENDING MORE EFFICIENT TOOL USAGE IN COLLABORATIVE WORK SYSTEMS

(71) Applicant: MONDAY.COM LTD., Tel Aviv (IL)

(72) Inventors: Aviram Marom, Tel Aviv-Jaffa (IL); Noa Kind, Tel Aviv (IL); Daniel Lereya, Tel Aviv (IL); Aviel Hershkovitz, Tel Aviv (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 17/243,752

(22) Filed: Apr. 29, 2021

(65) Prior Publication Data

US 2021/0349798 A1    Nov. 11, 2021

Related U.S. Application Data

(63) Continuation of application No. PCT/IB2021/000297, filed on Apr. 28, 2021, which is a continuation-in-part of application No. PCT/IB2021/000090, filed on Feb. 11, 2021, and a continuation-in-part of application No. PCT/IB2021/000024, filed on Jan. 14, 2021, and a continuation-in-part of application No. PCT/IB2020/000974, filed on Nov. 17, 2020, and a continuation-in-part of application No. PCT/IB2020/000658, filed on Aug. 7, 2020.

(Continued)

(51) Int. Cl.
*G06Q 10/10* (2012.01)
*H04L 29/08* (2006.01)
(Continued)

(52) U.S. Cl.
CPC ....... *G06Q 10/103* (2013.01); *G05B 13/0265* (2013.01); *G06F 3/0482* (2013.01);
(Continued)

(58) Field of Classification Search
CPC .......... G06F 2201/865; G06F 2201/88; G06F 40/30; G06F 40/177; G06F 11/302;
(Continued)

(56) References Cited

U.S. PATENT DOCUMENTS 5,479,602 A   12/1995  Baecker et al.
5,632,009 A    5/1997  Rao et al.
(Continued)

FOREIGN PATENT DOCUMENTS

CN    107422666 A    12/2017
CN    107623596 A     1/2018
(Continued)

OTHER PUBLICATIONS

Stephen Larson et al., Introducing Data Mining Concepts Using Microsoft Excel's Table Analysis Tools, Oct. 2015, [Retrieved on Nov. 19, 2021]. Retrieved from the internet: <URL: https://dl.acm.org/doi/pdf/10.5555/2831373.2831394> 3 Pages (127-129) (Year: 2015).*

(Continued)

*Primary Examiner* — Anibal Rivera
(74) *Attorney, Agent, or Firm* — Finnegan, Henderson, Farabow, Garrett & Dunner, LLP

(57) ABSTRACT

Systems, methods, and computer-readable media for self-monitoring software usage to optimize performance are disclosed. The systems and methods may involve at least one processor configured to: maintain a table; present to an entity a plurality of tools for manipulating data in the table; monitor tool usage by the entity to determine at least one tool historically used by the entity; compare the at least one tool historically used by the entity with information relating to the plurality of tools to thereby identify at least one alternative tool in the plurality of tools whose substituted usage is configured to provide improved performance over the at least one historically used tool; and present to the entity during a table use session a recommendation to use the at least one alternative tool.

21 Claims, 20 Drawing Sheets

Related U.S. Application Data

(60) Provisional application No. 63/148,092, filed on Feb. 10, 2021, provisional application No. 63/122,439, filed on Dec. 7, 2020, provisional application No. 63/121,803, filed on Dec. 4, 2020, provisional application No. 63/078,301, filed on Sep. 14, 2020, provisional application No. 63/019,396, filed on May 3, 2020, provisional application No. 63/018,593, filed on May 1, 2020.

(51) Int. Cl.

| | | |
|---|---|---|
| *G06F 16/176* | (2019.01) | |
| *G06Q 10/06* | (2012.01) | |
| *G06F 16/14* | (2019.01) | |
| *G06F 16/23* | (2019.01) | |
| *G06F 16/25* | (2019.01) | |
| *G06F 16/11* | (2019.01) | |
| *H04L 67/1095* | (2022.01) | |
| *G06F 3/0482* | (2013.01) | |
| *G06F 3/14* | (2006.01) | |
| *H04L 51/046* | (2022.01) | |
| *H04L 51/04* | (2022.01) | |
| *G06F 40/279* | (2020.01) | |
| *G06F 40/40* | (2020.01) | |
| *G06F 40/30* | (2020.01) | |
| *G06K 9/62* | (2022.01) | |
| *G06F 3/04817* | (2022.01) | |
| *G06F 3/16* | (2006.01) | |
| *H04L 12/18* | (2006.01) | |
| *G06F 16/22* | (2019.01) | |
| *G06F 16/2455* | (2019.01) | |
| *G06F 16/248* | (2019.01) | |
| *G06F 40/177* | (2020.01) | |
| *H04L 65/401* | (2022.01) | |
| *G06N 20/00* | (2019.01) | |
| *G06F 40/186* | (2020.01) | |
| *G06F 3/0484* | (2022.01) | |
| *G06F 11/30* | (2006.01) | |
| *G06F 11/34* | (2006.01) | |
| *G06F 40/103* | (2020.01) | |
| *G06F 3/04845* | (2022.01) | |
| *G06T 11/20* | (2006.01) | |
| *G06F 16/909* | (2019.01) | |
| *G06F 16/9038* | (2019.01) | |
| *G06F 16/9032* | (2019.01) | |
| *G06F 16/901* | (2019.01) | |
| *G06F 16/951* | (2019.01) | |
| *G06F 16/9536* | (2019.01) | |
| *G06F 16/28* | (2019.01) | |
| *G06F 16/26* | (2019.01) | |
| *G06F 40/253* | (2020.01) | |
| *H04L 51/18* | (2022.01) | |
| *H04L 51/48* | (2022.01) | |
| *G06F 16/903* | (2019.01) | |
| *G05B 13/02* | (2006.01) | |
| *B65D 83/04* | (2006.01) | |

(52) U.S. Cl.
CPC ........ *G06F 3/0484* (2013.01); *G06F 3/04817* (2013.01); *G06F 3/04845* (2013.01); *G06F 3/1454* (2013.01); *G06F 3/165* (2013.01); *G06F 11/302* (2013.01); *G06F 11/3409* (2013.01); *G06F 11/3438* (2013.01); *G06F 16/116* (2019.01); *G06F 16/144* (2019.01); *G06F 16/2282* (2019.01); *G06F 16/23* (2019.01); *G06F 16/2308* (2019.01); *G06F 16/2393* (2019.01); *G06F 16/248* (2019.01); *G06F 16/2456* (2019.01); *G06F 16/24564* (2019.01); *G06F 16/24565* (2019.01); *G06F 16/258* (2019.01); *G06F 16/26* (2019.01); *G06F 16/287* (2019.01); *G06F 16/909* (2019.01); *G06F 16/9017* (2019.01); *G06F 16/9038* (2019.01); *G06F 16/90328* (2019.01); *G06F 16/90344* (2019.01); *G06F 16/951* (2019.01); *G06F 16/9536* (2019.01); *G06F 40/103* (2020.01); *G06F 40/177* (2020.01); *G06F 40/186* (2020.01); *G06F 40/253* (2020.01); *G06F 40/279* (2020.01); *G06F 40/30* (2020.01); *G06F 40/40* (2020.01); *G06K 9/6215* (2013.01); *G06N 20/00* (2019.01); *G06Q 10/0633* (2013.01); *G06Q 10/06312* (2013.01); *G06Q 10/06313* (2013.01); *G06Q 10/06316* (2013.01); *G06Q 10/063114* (2013.01); *G06Q 10/063118* (2013.01); *G06Q 10/101* (2013.01); *G06T 11/206* (2013.01); *H04L 12/1827* (2013.01); *H04L 51/04* (2013.01); *H04L 51/046* (2013.01); *H04L 51/18* (2013.01); *H04L 51/28* (2013.01); *H04L 65/4015* (2013.01); *H04L 67/1095* (2013.01); *B65D 83/0409* (2013.01); *G06F 2201/865* (2013.01); *G06F 2201/88* (2013.01); *G06F 2203/04803* (2013.01); *G06T 2200/24* (2013.01)

(58) Field of Classification Search
CPC .. G06F 11/3409; G06F 11/343; G06F 16/144; G06F 16/2308; G06F 16/258; G06F 16/116; G06F 16/2282; G06F 16/24565; G06F 16/2456; G06F 16/248; G06F 16/24564; G06F 16/2393; G06F 16/909; G06F 16/23; G06F 16/9038; G06F 16/90328; G06F 16/9017; G06F 16/951; G06F 16/9536; G06F 16/287; G06F 16/26; G06Q 10/103; G06Q 10/0633; G06Q 10/101; G06Q 10/06313; G06Q 10/06316; G06Q 10/06312
See application file for complete search history.

(56) References Cited

U.S. PATENT DOCUMENTS

| | | |
|---|---|---|
| 5,696,702 A | 12/1997 | Skinner et al. |
| 5,726,701 A | 3/1998 | Needham |
| 5,787,411 A | 7/1998 | Groff et al. |
| 5,880,742 A | 3/1999 | Rao et al. |
| 5,933,145 A | 8/1999 | Meek |
| 6,016,553 A | 1/2000 | Schneider et al. |
| 6,023,695 A * | 2/2000 | Osborn ................ G06F 16/284 |
| 6,167,405 A | 12/2000 | Rosensteel, Jr. et al. |
| 6,169,534 B1 | 1/2001 | Raffel et al. |
| 6,185,582 B1 | 2/2001 | Zellweger et al. |
| 6,195,794 B1 | 2/2001 | Buxton |
| 6,266,067 B1 | 7/2001 | Owen et al. |
| 6,275,809 B1 | 8/2001 | Tamaki et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,522,347 B1 | 2/2003 | Tsuji et al. |
| 6,527,556 B1 | 3/2003 | Koskinen |
| 6,606,740 B1 | 8/2003 | Lynn et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 7,027,997 B1 | 4/2006 | Robinson et al. |
| 7,043,529 B1 | 5/2006 | Simonoff |

(56) References Cited

U.S. PATENT DOCUMENTS

| | | |
|---|---|---|
| 7,054,891 B2 | 5/2006 | Cole |
| 7,237,188 B1 | 6/2007 | Leung |
| 7,249,042 B1 | 7/2007 | Doerr et al. |
| 7,272,637 B1 | 9/2007 | Himmelstein |
| 7,379,934 B1 | 5/2008 | Forman et al. |
| 7,383,320 B1 | 6/2008 | Silberstein et al. |
| 7,415,664 B2 | 8/2008 | Aureglia et al. |
| 7,489,976 B2 | 2/2009 | Adra |
| 7,685,152 B2 | 3/2010 | Chivukula et al. |
| 7,707,514 B2 | 4/2010 | Forstall et al. |
| 7,710,290 B2 | 5/2010 | Johnson |
| 7,770,100 B2 | 8/2010 | Chamberlain et al. |
| 7,827,476 B1 | 11/2010 | Roberts et al. |
| 7,916,157 B1 | 3/2011 | Kelley et al. |
| 7,954,064 B2 | 5/2011 | Forstall et al. |
| 8,046,703 B2 | 10/2011 | Busch et al. |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,423,909 B2 | 4/2013 | Zabielski |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,026,897 B2 | 5/2015 | Zarras |
| 9,043,362 B2 | 5/2015 | Weissman et al. |
| 9,129,234 B2 | 9/2015 | Campbell et al. |
| 9,172,738 B1 | 10/2015 | daCosta |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,424,287 B2 | 8/2016 | Schroth |
| 9,424,333 B1 | 8/2016 | Bisignani et al. |
| 9,430,458 B2 | 8/2016 | Rhee et al. |
| 9,449,031 B2 | 9/2016 | Barrus et al. |
| 9,558,172 B2 | 1/2017 | Rampson et al. |
| 9,613,086 B1 | 4/2017 | Sherman |
| 9,635,091 B1 | 4/2017 | Laukkanen et al. |
| 9,679,456 B2 | 6/2017 | East |
| 9,720,602 B1 | 8/2017 | Chen et al. |
| 9,727,376 B1 | 8/2017 | Bills et al. |
| 9,798,829 B1 | 10/2017 | Baisley |
| 9,866,561 B2 | 1/2018 | Psenka et al. |
| 9,870,136 B2 | 1/2018 | Pourshahid |
| 10,043,296 B2 | 8/2018 | Li |
| 10,067,928 B1 | 9/2018 | Krappe |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,347,017 B2 | 7/2019 | Ruble et al. |
| 10,372,706 B2 * | 8/2019 | Chavan ............... G06F 16/2455 |
| 10,380,140 B2 | 8/2019 | Sherman |
| 10,445,702 B1 | 10/2019 | Hunt |
| 10,452,360 B1 | 10/2019 | Burman et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,564,622 B1 | 2/2020 | Dean et al. |
| 10,628,002 B1 | 4/2020 | Kang et al. |
| 10,706,061 B2 | 7/2020 | Sherman et al. |
| 10,719,220 B2 | 7/2020 | Ouellet et al. |
| 10,740,117 B2 | 8/2020 | Ording et al. |
| 10,747,764 B1 | 8/2020 | Plenderleith |
| 10,747,950 B2 | 8/2020 | Dang et al. |
| 10,748,312 B2 | 8/2020 | Ruble et al. |
| 10,754,688 B2 | 8/2020 | Powell |
| 10,795,555 B2 | 10/2020 | Burke et al. |
| 10,817,660 B2 | 10/2020 | Rampson et al. |
| D910,077 S | 2/2021 | Naroshevitch et al. |
| 10,963,578 B2 | 3/2021 | More et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 2001/0008998 A1 | 7/2001 | Tamaki et al. |
| 2001/0032248 A1 | 10/2001 | Krafchin |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0135558 A1 | 7/2003 | Bellotti et al. |
| 2003/0187864 A1 | 10/2003 | McGoveran |
| 2003/0200215 A1 | 10/2003 | Chen et al. |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0172592 A1 | 9/2004 | Collie et al. |
| 2004/0212615 A1 | 10/2004 | Uthe |
| 2004/0215443 A1 | 10/2004 | Hatton |
| 2004/0268227 A1 | 12/2004 | Brid |
| 2005/0034058 A1 | 2/2005 | Mills et al. |
| 2005/0039001 A1 | 2/2005 | Hudis et al. |
| 2005/0044486 A1 | 2/2005 | Kotler et al. |
| 2005/0086360 A1 | 4/2005 | Mamou et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0171881 A1 | 8/2005 | Ghassemieh et al. |
| 2005/0257204 A1 | 11/2005 | Bryant et al. |
| 2005/0278297 A1 | 12/2005 | Nelson |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0015806 A1 | 1/2006 | Wallace |
| 2006/0031148 A1 | 2/2006 | O'Dell et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0107196 A1 | 5/2006 | Thanu et al. |
| 2006/0111953 A1 | 5/2006 | Setya |
| 2006/0129415 A1 | 6/2006 | Thukral et al. |

(56) References Cited

U.S. PATENT DOCUMENTS

| | | |
|---|---|---|
| 2006/0136828 A1 | 6/2006 | Asano |
| 2006/0173908 A1 | 8/2006 | Browning et al. |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0250369 A1 | 11/2006 | Keim |
| 2006/0253205 A1 | 11/2006 | Gardiner |
| 2006/0287998 A1 | 12/2006 | Folting et al. |
| 2007/0050322 A1 | 3/2007 | Vigesaa et al. |
| 2007/0073899 A1 | 3/2007 | Judge et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0220119 A1 | 9/2007 | Himmelstein |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034314 A1 | 2/2008 | Louch et al. |
| 2008/0065460 A1 | 3/2008 | Raynor |
| 2008/0077530 A1 | 3/2008 | Banas et al. |
| 2008/0104091 A1 | 5/2008 | Chin |
| 2008/0126389 A1 | 5/2008 | Mush et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0195948 A1 | 8/2008 | Bauer |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0132470 A1 | 5/2009 | Vignet |
| 2009/0174680 A1 | 7/2009 | Anzures et al. |
| 2009/0198715 A1 | 8/2009 | Barbarek |
| 2009/0248710 A1 | 10/2009 | McCormack et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319882 A1 | 12/2009 | Morrison et al. |
| 2009/0327240 A1 | 12/2009 | Meehan et al. |
| 2009/0327851 A1 | 12/2009 | Raposo |
| 2010/0017699 A1 | 1/2010 | Farrell et al. |
| 2010/0070895 A1 | 3/2010 | Messer |
| 2010/0088636 A1 | 4/2010 | Yerkes et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241990 A1 | 9/2010 | Gabriel et al. |
| 2010/0251090 A1 | 9/2010 | Chamberlain et al. |
| 2010/0257015 A1 | 10/2010 | Molander |
| 2010/0262625 A1 | 10/2010 | Pittenger |
| 2010/0287221 A1 | 11/2010 | Battepati et al. |
| 2010/0324964 A1 | 12/2010 | Callanan et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0219321 A1 | 9/2011 | Gonzalez et al. |
| 2011/0225525 A1 | 9/2011 | Chasman et al. |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0079408 A1 | 3/2012 | Rohwer |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman et al. |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233533 A1 | 9/2012 | Yücel et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2013/0018952 A1 | 1/2013 | McConnell et al. |
| 2013/0018953 A1 | 1/2013 | McConnell et al. |
| 2013/0024760 A1 | 1/2013 | Vogel et al. |
| 2013/0041958 A1 | 2/2013 | Post et al. |
| 2013/0055113 A1 | 2/2013 | Chazin et al. |
| 2013/0086460 A1 | 4/2013 | Folting et al. |
| 2013/0090969 A1 | 4/2013 | Rivere |
| 2013/0104035 A1 | 4/2013 | Wagner et al. |
| 2013/0111320 A1 | 5/2013 | Campbell et al. |
| 2013/0159832 A1 | 6/2013 | Ingargiola et al. |
| 2013/0159907 A1 | 6/2013 | Brosche et al. |
| 2013/0211866 A1 | 8/2013 | Gordon et al. |
| 2013/0238968 A1 | 9/2013 | Barrus |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2014/0006326 A1 | 1/2014 | Bazanov |
| 2014/0019842 A1 | 1/2014 | Montagna et al. |

(56) References Cited

U.S. PATENT DOCUMENTS

| | | |
|---|---|---|
| 2014/0043331 A1 | 2/2014 | Makinen et al. |
| 2014/0046638 A1 | 2/2014 | Peloski |
| 2014/0052749 A1 | 2/2014 | Rissanen |
| 2014/0068403 A1 | 3/2014 | Bhargav et al. |
| 2014/0074545 A1 | 3/2014 | Minder et al. |
| 2014/0109012 A1 | 4/2014 | Choudhary et al. |
| 2014/0115518 A1 | 4/2014 | Abdukalykov et al. |
| 2014/0136972 A1 | 5/2014 | Rodgers et al. |
| 2014/0137144 A1 | 5/2014 | Jarvenpaa et al. |
| 2014/0173401 A1 | 6/2014 | Oshlag et al. |
| 2014/0188748 A1 | 7/2014 | Cavoue et al. |
| 2014/0195933 A1 | 7/2014 | Rao Dv |
| 2014/0214404 A1 | 7/2014 | Kalia et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0324497 A1 | 10/2014 | Verma et al. |
| 2014/0365938 A1 | 12/2014 | Black et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0074721 A1 | 3/2015 | Fishman et al. |
| 2015/0074728 A1 | 3/2015 | Chai et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0153943 A1 | 6/2015 | Wang |
| 2015/0169531 A1 | 6/2015 | Campbell et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0278699 A1 | 10/2015 | Danielsson |
| 2015/0295877 A1 | 10/2015 | Roman |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0253982 A1 | 9/2016 | Cheung et al. |
| 2016/0275150 A1 | 9/2016 | Bournonnais et al. |
| 2016/0299655 A1 | 10/2016 | Migos et al. |
| 2016/0321235 A1 | 11/2016 | He et al. |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0350950 A1 | 12/2016 | Ritchie et al. |
| 2017/0031967 A1* | 2/2017 | Chavan .................. G06F 16/23 |
| 2017/0041296 A1 | 2/2017 | Ford et al. |
| 2017/0061360 A1 | 3/2017 | Rucker et al. |
| 2017/0063722 A1 | 3/2017 | Cropper et al. |
| 2017/0075557 A1 | 3/2017 | Noble et al. |
| 2017/0091337 A1 | 3/2017 | Patterson |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0126772 A1 | 5/2017 | Campbell et al. |
| 2017/0139884 A1 | 5/2017 | Bendig et al. |
| 2017/0153771 A1 | 6/2017 | Chu |
| 2017/0185668 A1 | 6/2017 | Convertino et al. |
| 2017/0221072 A1 | 8/2017 | AthuluruTlrumala et al. |
| 2017/0236081 A1 | 8/2017 | Grady Smith et al. |
| 2017/0272316 A1 | 9/2017 | Johnson et al. |
| 2017/0272331 A1 | 9/2017 | Lissack |
| 2017/0285879 A1 | 10/2017 | Pilkington et al. |
| 2017/0285890 A1 | 10/2017 | Dolman |
| 2017/0315683 A1 | 11/2017 | Boucher et al. |
| 2017/0329479 A1 | 11/2017 | Rauschenbach et al. |
| 2017/0351252 A1 | 12/2017 | Kleifges et al. |
| 2017/0372442 A1 | 12/2017 | Mejias |
| 2018/0025084 A1* | 1/2018 | Conlan .................. G06F 16/955 <br> 707/734 |
| 2018/0032570 A1 | 2/2018 | Miller et al. |
| 2018/0055434 A1 | 3/2018 | Cheung et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088989 A1 | 3/2018 | Nield et al. |
| 2018/0095938 A1 | 4/2018 | Monte |
| 2018/0096417 A1 | 4/2018 | Cook et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0276417 A1 | 9/2018 | Cerezo |
| 2018/0293669 A1 | 10/2018 | Jackson et al. |
| 2018/0329930 A1 | 11/2018 | Eberlein et al. |
| 2018/0357305 A1 | 12/2018 | Kinast et al. |
| 2018/0373434 A1 | 12/2018 | Switzer et al. |
| 2018/0373757 A1 | 12/2018 | Schukovets et al. |
| 2019/0036989 A1 | 1/2019 | Eirinberg et al. |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0073350 A1 | 3/2019 | Shiotani |
| 2019/0095413 A1 | 3/2019 | Davis et al. |
| 2019/0130611 A1 | 5/2019 | Black et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0208058 A1 | 7/2019 | Dvorkin et al. |
| 2019/0236188 A1* | 8/2019 | McKenna ............ G06F 16/2453 |
| 2019/0251884 A1 | 8/2019 | Burns et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0026397 A1 | 1/2020 | Wohlstadter et al. |
| 2020/0042648 A1* | 2/2020 | Rao .......................... G06F 8/20 |
| 2020/0151630 A1 | 5/2020 | Shakhnovich |
| 2020/0159558 A1 | 5/2020 | Bak et al. |
| 2020/0247661 A1 | 8/2020 | Rao et al. |
| 2020/0279315 A1* | 9/2020 | Manggala ............ G06F 16/285 |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0348809 A1 | 11/2020 | Drescher |
| 2020/0349320 A1 | 11/2020 | Owens |

(56) References Cited

U.S. PATENT DOCUMENTS

| | | | |
|---|---|---|---|
| 2020/0356873 A1* | 11/2020 | Nawrocke | G06F 16/24561 |
| 2020/0380212 A1 | 12/2020 | Butler et al. | |
| 2020/0380449 A1 | 12/2020 | Choi | |
| 2020/0387664 A1 | 12/2020 | Kusumura et al. | |
| 2020/0401581 A1 | 12/2020 | Eubank et al. | |
| 2021/0019287 A1 | 1/2021 | Prasad et al. | |
| 2021/0021603 A1 | 1/2021 | Gibbons | |
| 2021/0042796 A1 | 2/2021 | Khoury et al. | |
| 2021/0049555 A1 | 2/2021 | Shor | |
| 2021/0055955 A1 | 2/2021 | Yankelevich et al. | |
| 2021/0056509 A1 | 2/2021 | Lindy | |
| 2021/0084120 A1 | 3/2021 | Fisher et al. | |
| 2021/0124872 A1 | 4/2021 | Lereya | |
| 2021/0149553 A1 | 5/2021 | Lereya et al. | |
| 2021/0150489 A1 | 5/2021 | Haramati et al. | |
| 2021/0165782 A1 | 6/2021 | Deshpande et al. | |
| 2021/0166196 A1 | 6/2021 | Lereya et al. | |
| 2021/0166339 A1 | 6/2021 | Mann et al. | |
| 2021/0173682 A1 | 6/2021 | Chakraborti et al. | |

FOREIGN PATENT DOCUMENTS

| | | |
|---|---|---|
| CN | 107885656 A | 4/2018 |
| CN | 112929172 A | 6/2021 |
| WO | WO 2004/100015 A2 | 11/2004 |
| WO | WO 2006/116580 A2 | 11/2006 |
| WO | WO 2017202159 A1 | 11/2017 |

OTHER PUBLICATIONS

Isaiah Pinchas et al., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).*
U.S. Appl. No. 17/143,897, filed Jan. 7, 2021.
U.S. Appl. No. 17/143,603, filed Jan. 7, 2021.
U.S. Appl. No. 17/143,745, filed Jan. 7, 2021.
U.S. Appl. No. 17/143,482, filed Jan. 7, 2021.
U.S. Appl. No. 17/143,768, filed Jan. 7, 2021.
U.S. Appl. No. 17/143,677, filed Jan. 7, 2021.
U.S. Appl. No. 17/143,653, filed Jan. 7, 2021.
U.S. Appl. No. 17/143,916, filed Jan. 7, 2021.
U.S. Appl. No. 17/143,475, filed Jan. 7, 2021.
U.S. Appl. No. 17/143,865, filed Jan. 7, 2021.
U.S. Appl. No. 17/143,462, filed Jan. 7, 2021.
U.S. Appl. No. 17/143,470, filed Jan. 7, 2021.
U.S. Appl. No. 17/143,905, filed Jan. 7, 2021.
U.S. Appl. No. 17/143,798, filed Jan. 7, 2021.
U.S. Appl. No. 17/143,892, filed Jan. 7, 2021.
U.S. Appl. No. 17/243,716, filed Apr. 29, 2021.
U.S. Appl. No. 17/243,727, filed Apr. 29, 2021.
U.S. Appl. No. 17/232,978, filed Apr. 16, 2021.
U.S. Appl. No. 17/243,809, filed Apr. 29, 2021.
U.S. Appl. No. 17/243,901, filed Apr. 29, 2021.
U.S. Appl. No. 17/232,354, filed Apr. 16, 2021.
U.S. Appl. No. 17/243,898, filed Apr. 29, 2021.
U.S. Appl. No. 17/243,969, filed Apr. 29, 2021.
U.S. Appl. No. 17/243,742, filed Apr. 29, 2021.
U.S. Appl. No. 17/243,763, filed Apr. 29, 2021.
U.S. Appl. No. 17/232,754, filed Apr. 16, 2021.
U.S. Appl. No. 17/232,827, filed Apr. 16, 2021.
U.S. Appl. No. 17/243,807, filed Apr. 29, 2021.
U.S. Appl. No. 17/243,848, filed Apr. 29, 2021.
U.S. Appl. No. 17/243,934, filed Apr. 29, 2021.
U.S. Appl. No. 17/244,121, filed Apr. 29, 2021.
U.S. Appl. No. 17/244,027, filed Apr. 29, 2021.
U.S. Appl. No. 17/244,157, filed Apr. 29, 2021.
U.S. Appl. No. 17/243,725, filed Apr. 29, 2021.
U.S. Appl. No. 17/243,737, filed Apr. 29, 2021.
U.S. Appl. No. 17/243,748, filed Apr. 29, 2021.
U.S. Appl. No. 16/453,065, filed Jun. 26, 2019.
U.S. Appl. No. 17/243,691, filed Apr. 29, 2021.
U.S. Appl. No. 17/243,722, filed Apr. 29, 2021.
U.S. Appl. No. 17/243,892, filed Apr. 29, 2021.
U.S. Appl. No. 17/243,977, filed Apr. 29, 2021.
U.S. Appl. No. 17/243,764, filed Apr. 29, 2021.
U.S. Appl. No. 17/243,837, filed Apr. 29, 2021.
U.S. Appl. No. 17/243,729, filed Apr. 29, 2021.
U.S. Appl. No. 17/243,802, filed Apr. 29, 2021.
U.S. Appl. No. 17/242,452, filed Apr. 28, 2021.
U.S. Appl. No. 17/243,891, filed Apr. 29, 2021.
U.S. Appl. No. 17/243,775, filed Apr. 29, 2021.
U.S. Appl. No. 17/243,731, filed Apr. 29, 2021.
U.S. Appl. No. 17/243,768, filed Apr. 29, 2021.
U.S. Appl. No. 16/502,679, filed Jul. 3, 2019.
D'Elessio et al., Monday.com Walkthrough 2018\All Features, Platforms & Thoughts, Mar. 1, 2018, pp. 1-55, 2018.
Rordigo et al., Project Management with Monday.com: a 101 Introduction; Jul. 22, 2019, pp. 1-21, 2019.
International Search Report and Written Opinion of the International Searching Authority in PCT/IB2020/000658, dated Nov. 11, 2020 (12 pages).
International Search Report and Written Opinion of the International Searching Authority in PCT/IB2020/000974, dated May 3, 2021 (19 pages).
ShowMyPC, "Switch Presenter While Using ShowMyPC"; web.archive.org; Aug. 20, 2016.
International Search Report and Written Opinion of the International Searching Authority in PCT/IB2021/000024, dated May 3, 2021 (13 pages).
"Pivot table—Wikipedia"; URL: https://en.wikipedia.org/w/index.php?title=Pivot_table&oldid=857163289, originally retrieved on Oct. 23, 2019; retrieved on Jul. 16, 2021.
International Search Report in PCT/1B2021/000090 dated Jul. 27, 2021.
International Search Report and Written Opinion of the International Search Authority in PCT/1B2020/000024, dated May 3, 2021 (13 pages).
"Pivot table—Wikipedia"; URL: https://en.wikepedia .org/w/index.php?title=Pivot_table&oldid=857163289, originally retrieve on Oct. 23, 2019; retrieved on Jul. 16, 2021.
Vishal Singh, "A Theoretical Framework of a BIM-based Multi-Disciplinary Collaboration Platform", Nov. 5, 2020, Automation in Construction, 20 (2011), pp. 134-144 (Year: 2011).
Edward A. Stohr, Workflow Automation: Overview and Research Issues, 2001, Information Systems Frontiers 3:3, pp. 281-296 (Year: 2001).

* cited by examiner

Figure 3:
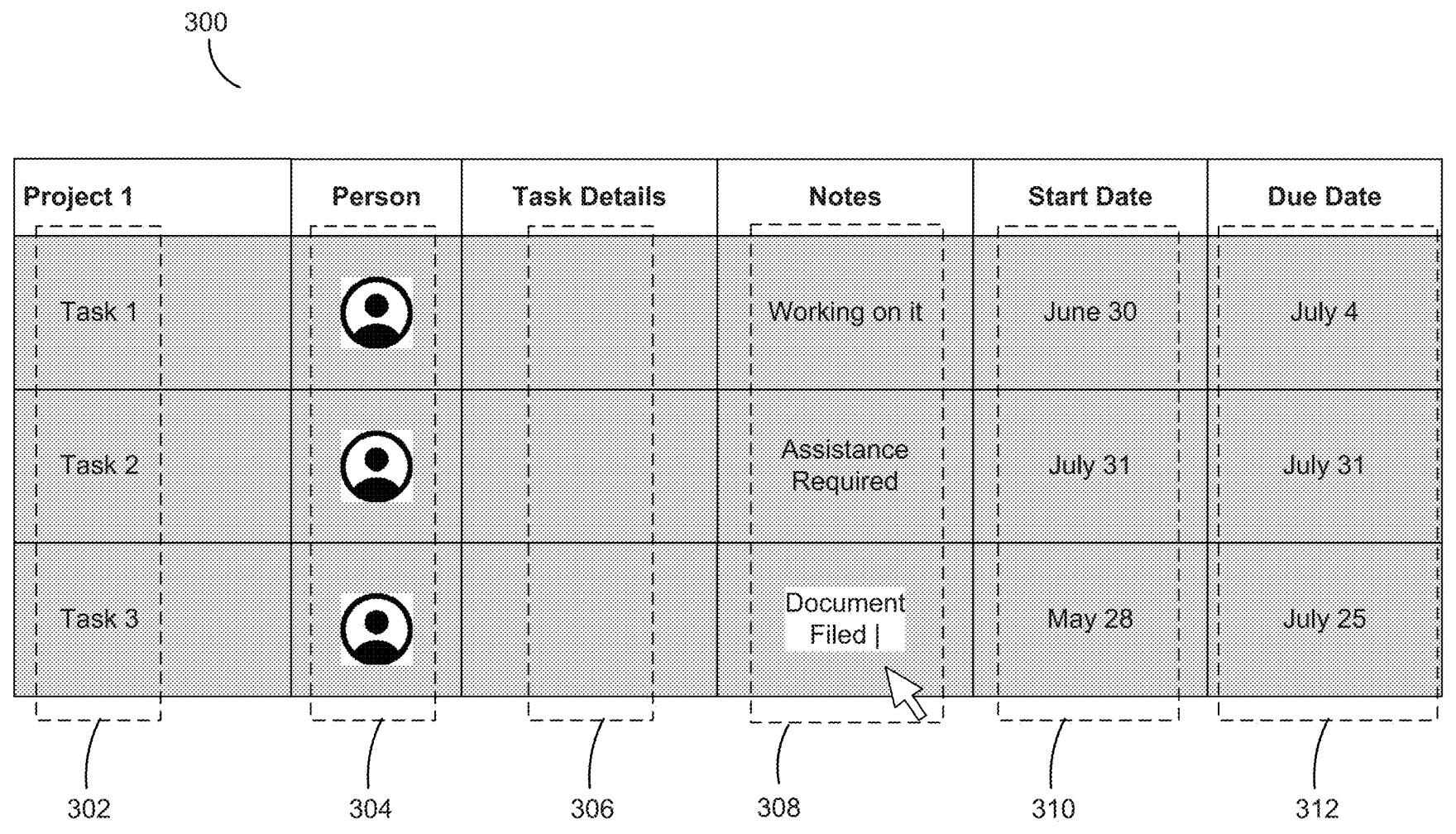

| Project 1 | Person | Task Details | Notes | Start Date | Due Date |
|---|---|---|---|---|---|
| Task 1 | ● | | Working on it | June 30 | July 4 |
| Task 2 | ● | | Assistance Required | July 31 | July 31 |
| Task 3 | ● | | Document Filed | May 28 | July 25 |

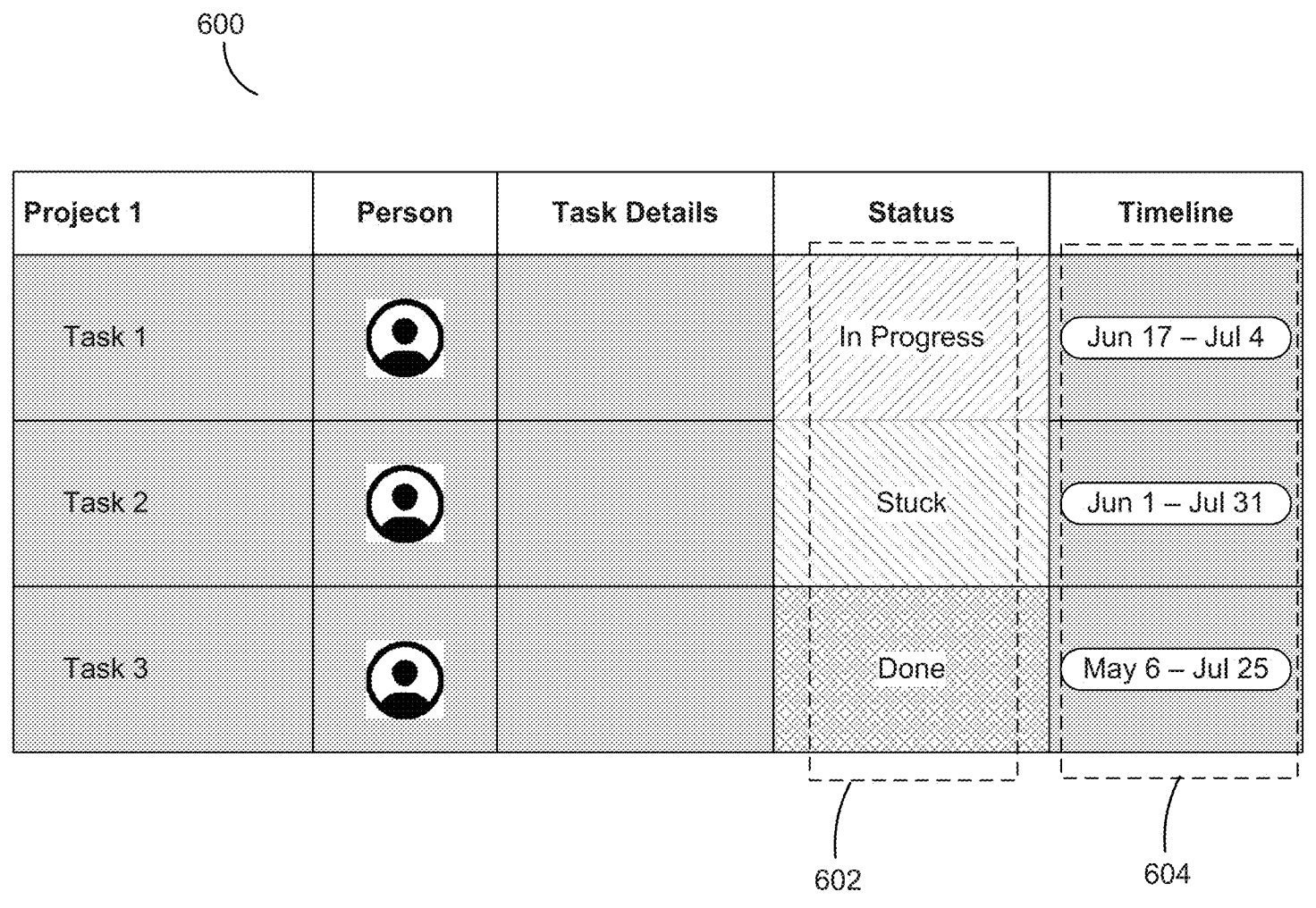

| Project 1 | Person | Task Details | Status | Timeline |
|---|---|---|---|---|
| Task 1 | 👤 | | In Progress | Jun 17 – Jul 4 |
| Task 2 | 👤 | | Stuck | Jun 1 – Jul 31 |
| Task 3 | 👤 | | Done | May 6 – Jul 25 |

FIG. 6

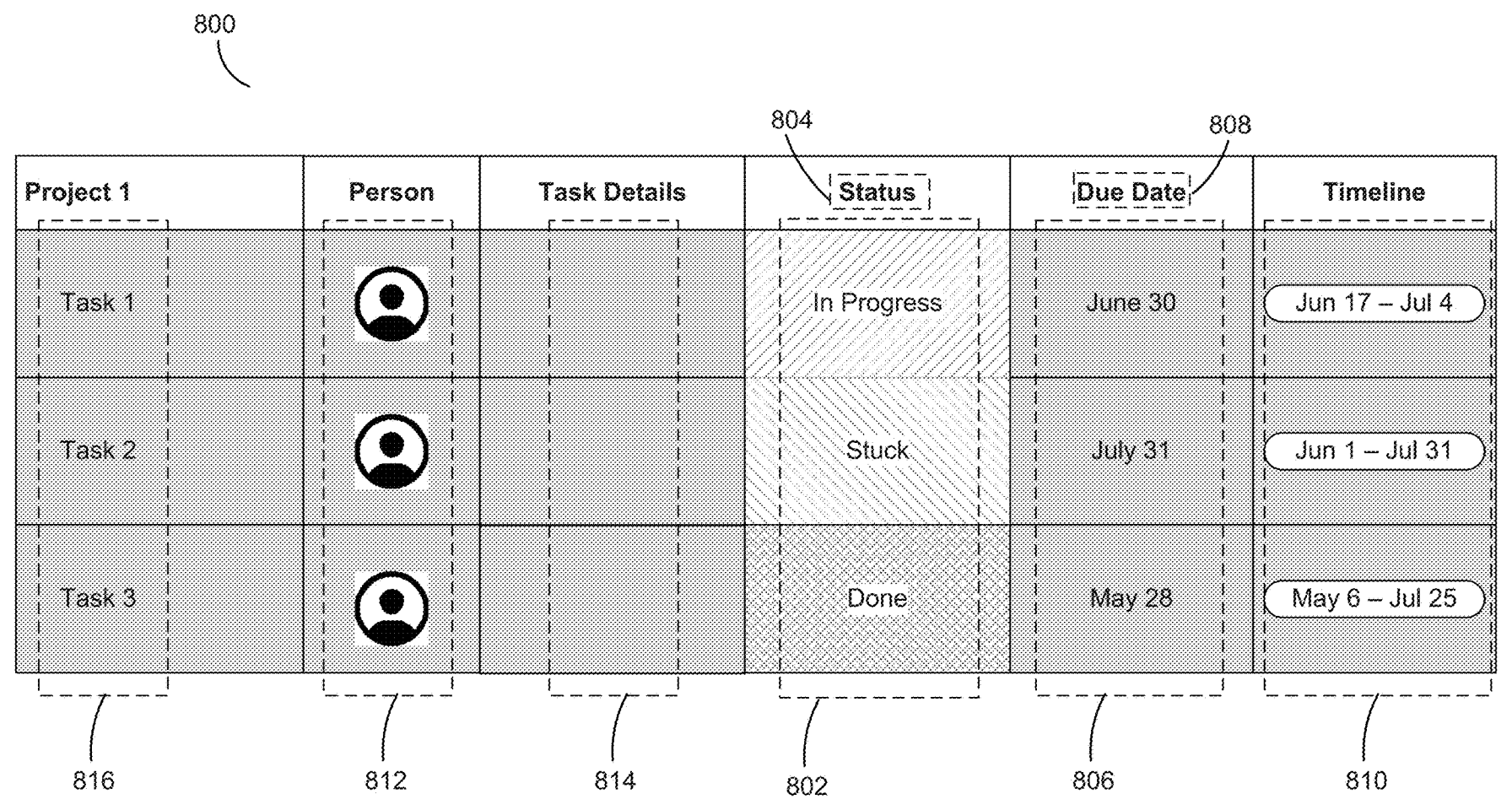

| Project 1 | Person | Task Details | Status | Due Date | Timeline |
|---|---|---|---|---|---|
| Task 1 | 👤 | | In Progress | June 30 | Jun 17 – Jul 4 |
| Task 2 | 👤 | | Stuck | July 31 | Jun 1 – Jul 31 |
| Task 3 | 👤 | | Done | May 28 | May 6 – Jul 25 |

FIG. 8

DIGITAL PROCESSING SYSTEMS AND METHODS FOR SELF-MONITORING SOFTWARE RECOMMENDING MORE EFFICIENT TOOL USAGE IN COLLABORATIVE WORK SYSTEMS

CROSS-REFERENCE TO RELATED APPLICATIONS

This application is based on and claims benefit of priority of U.S. Nonprovisional patent application Ser. No. 17/242,452 filed on Apr. 28, 2021, which claims priority to U.S. Provisional Patent Application No. 63/018,593, filed May 1, 2020, U.S. Provisional Patent Application No. 63/019,396, filed May 3, 2020, U.S. Provisional Patent Application No. 63/078,301, filed Sep. 14, 2020, U.S. Provisional Patent Application No. 63/121,803, filed on Dec. 4, 2020, U.S. Provisional Patent Application No. 63/122,439, filed on Dec. 7, 2020, and U.S. Provisional Patent Application No. 63/148,092, filed on Feb. 10, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

One aspect of the present disclosure is directed to a systems, methods, and computer readable media for self-monitoring software usage to optimize performance. The system may include at least one processor configured to: maintain a table; present to an entity a plurality of tools for manipulating data in the table; monitor tool usage by the entity to determine at least one tool historically used by the entity; compare the at least one tool historically used by the entity with information relating to the plurality of tools to thereby identify at least one alternative tool in the plurality of tools whose substituted usage is configured to provide improved performance over the at least one historically used tool; and present to the entity during a table use session a recommendation to use the at least one alternative tool.

One aspect of the present disclosure is directed to a systems, methods, and computer readable media for predicting required functionality and for identifying application modules for accomplishing the predicted required functionality. Aspects of the disclosure may involve outputting a logical sentence structure template for use in building a new application module, the logical sentence structure template including a plurality of definable variables that when selected result in a logical sentence structure delineating a function of the new application module; receiving at least one input for at least one of the definable variables; performing language processing on the logical sentence structure including the at least one received input to thereby characterize the function of the new application module; comparing the characterized function of the new application module with pre-stored information related to a plurality of predefined application modules to determine at least one similarity to a specific predefined application module; and based on the at least one similarity, presenting the specific predefined application module as an adoptable alternative for accomplishing the function.

One aspect of the present disclosure is directed to systems, methods, and computer readable media for associating a plurality of logical rules with groupings of data. The system may include at least one processor configured to: maintain a table containing columns; access a data structure containing the plurality of logical rules including a first particular logical rule that when linked to a first particular column, enables a table action in response to a condition change in a cell associated with the first particular logical rule linked to the first particular column; access a correlation index identifying a plurality of column types and a subset of the plurality of logical rules typically associated with each column type; receive a selection of a new column to be added to the table; in response to the received selection, perform a look up in the correlation index for logical rules typically associated with a type of the new column; present a pick list of the logical rules typically associated with the type of the new column; receive a selection from the pick list; link to the new column a second particular logical rule associated with the selection from the pick list; and implement the second particular logical rule when data in the new column meets a condition of the second particular logical rule.

BRIEF DESCRIPTION OF THE DRAWINGS

FIG. 3 illustrates an example of a table that includes multiple columns and rows, consistent with some embodiments of the present disclosure.

FIG. 5 illustrates an example of an interface for enabling selection of multiple tool recommendations, consistent with some embodiments of the present disclosure.

FIG. 6 illustrates an example of a table with implemented tool recommendations, consistent with some embodiments of the present disclosure.

FIG. 8 illustrates an example of a table that includes multiple columns and rows, consistent with some embodiments of the present disclosure.

DETAILED DESCRIPTION

Figure 1:
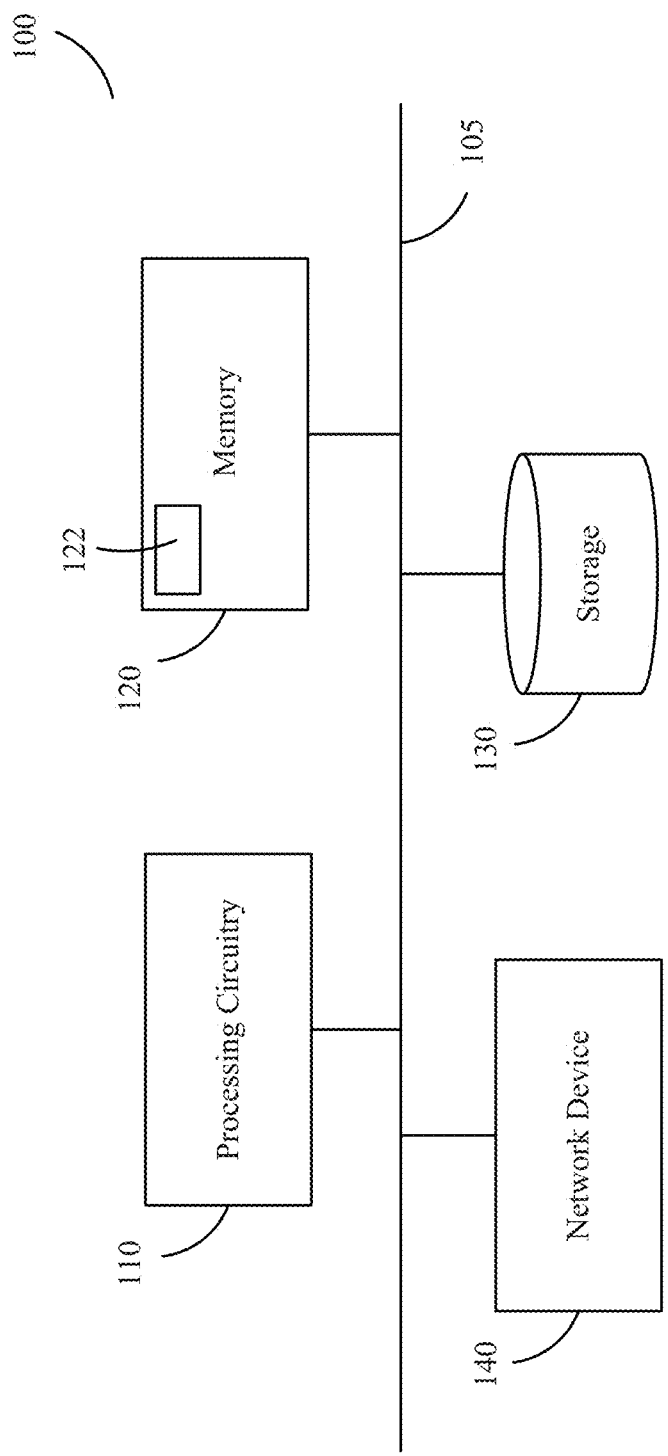
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, a tablature may include any suitable information. When used in conjunction with a workflow management application, the tablature may include any information associated with one or more tasks, such as one or more status values, projects, countries, persons, teams, progresses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
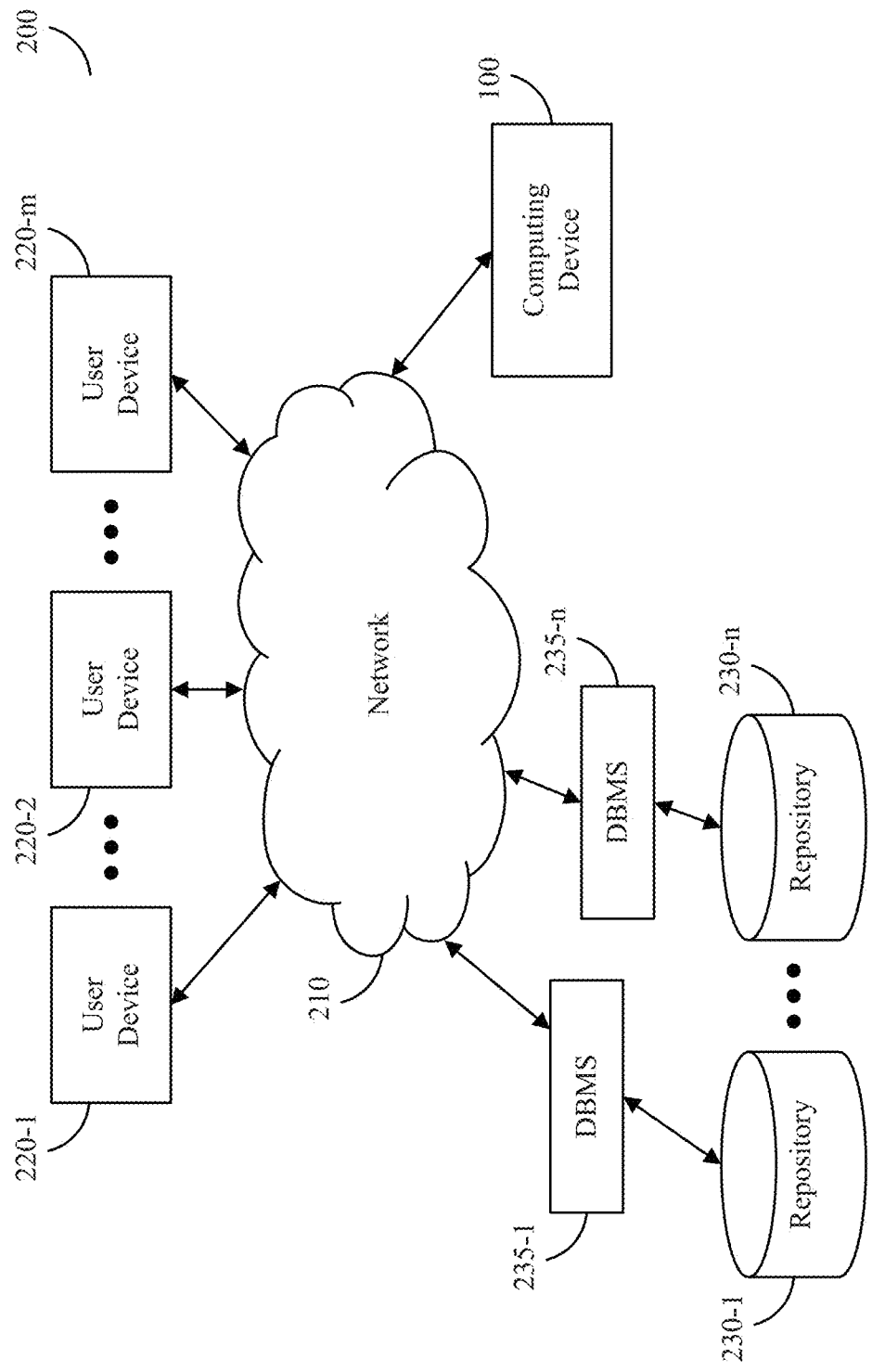
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-$m$, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-$n$, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-$n$. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Operation of modern enterprises can be complicated and time consuming. In many cases, managing the operation of a single project may require integration of several employees, departments, and other resources of an entity. To manage the challenging operation, project management software applications may be used. Such software applications may enable organizing, planning, and management of resources by providing project-related information in order to optimize the time and resources spent on each project. This may be accomplished using tools, functions, or rules that automatically update project-related information based on one or more formulas or conditions. However, the number of rules and/or functions that may be used with relation to a project may be virtually limitless. Current systems lack the ability to effectively and efficiently determine what rules or functions are most appropriate for a project, producing inefficient outcomes for users.

Therefore, there is a need for unconventional approaches to enable computer systems to monitor tool usage and determine tools, functions, and/or rules that may be implemented to improve efficiency of project management software applications. Various embodiments of the present disclosure describe unconventional systems, methods, and computer readable media for self-monitoring software usage to optimize performance. The various embodiments of the present disclosure describe at least a technological solution, based on improvement to operations of computer systems and platforms, to the technical challenge of determining the most appropriate tools, functions, and rules to implement on a platform by an intelligent analysis of different groupings of data in a project management platform.

Disclosed embodiments may include systems, methods, and computer-readable media related to self-monitoring software usage to optimize performance. As discussed above, some software applications, such as project management software applications, may enable organization, planning, and/or management of resources by interactively presenting project-related information that may be integrated with a variety of tools that may optimize performance. A single software application, however, may include an unlimited number of tools that may be unknown or not readily accessible to a user. For example, an average user of a spreadsheet application will likely not be knowledgeable of all of the tools available in the spreadsheet application and will therefore be unable to make the most efficient use of the application for its intended purpose. By monitoring a user's historical tool usage, the system may determine whether the user is efficiently utilizing the system to achieve the user's goals and recommend more efficient tools if the system determine that the user is not using tools that may improve their workflows. Monitoring software usage may include an analyzing the historical usage of tools in the system to determine tools that have been historically used, determine whether unused tools may improve data processing efficiency, and storing such determination to present recommendations to a user. Advantageously, disclosed embodiments may address this issue by enabling software applications to self-monitor tool usage to identify and present tools that may increase efficiency and optimize performance of the application's intended use.

Disclosed embodiments may include maintaining a table. As described previously in greater detail, a table may include data presented in horizontal and vertical rows, as previously discussed. A table may also refer to a collection of one or more groupings of data that may be associated with logical rules that serve to optimize performance and is accessible by at least one entity associated with the table. A logical rule, as described previously in greater detail, may refer to a combination of one or more automated conditions, triggers, and/or actions that may be implemented with respect to disclosed systems, methods, and computer-readable media, or it may refer to any other logical associations between one or more groupings of data. A grouping of data may refer to cells, columns, rows, tables, dashboards, widgets, templates, and/or any other data structure or a combination thereof to provide a workflow in association with a table or other workspace. An exemplary logical rule may include a plurality of automations that trigger various actions. For example, a logical rule (e.g., automation) may be configured to monitor a condition and to determine if a particular status is "complete" before the logical rule triggers an action of archiving a completed task.

FIG. 3 illustrates an example of a table 300 that may include multiple columns, consistent with embodiments of the present disclosure. In some embodiments, table 300 may be displayed using a computing device (e.g., the computing device 100 illustrated in FIG. 1), software running thereon, or any other projecting device (e.g., projector, AR or VR lens, or any other display device) as previously discussed. For example, in some embodiments, an application may be configured to transmit information to at least one user device or modify data contained in one or more data structures. The table 300 may be associated with a project and may include, in the multiple rows and columns, tasks (e.g., in rows including "Task 1," "Task 2," or "Task 3") included in the project, persons (e.g., in a column 304) assigned to the tasks, details (e.g., in a column 306) of the tasks, notes (e.g., in a column 308) associated with the tasks, start dates (e.g., in a column 310) of the tasks, due dates (e.g., in a column 312) of the tasks, or any information, characteristic, or associated entity of the project. In some embodiments, table 300 may be associated with one or more logical rules. For example, table 300 may be associated with an application module that is configured to perform the functionality of sending a notification to a user device associated with one or more persons in column 304 when a due date in column 312 passes.

Some embodiments may include presenting to an entity a plurality of tools for manipulating data in the table. An entity may refer to any user or combination of users (or their associated client devices) associated with a table, such as a table owner, an organization, a team, or any other individual(s) with access rights to the table. A tool may refer to any groupings of data or logical rules that are configured for one or more particular functionalities. By way of some non-limiting examples, a tool may include a column of a certain type (e.g., a status column, a text column, a date column, etc.), a row associating data in a plurality of columns (e.g., a row associating an individual, a task associated with the individual, and a due date associated with the task), or a logical rule that is triggered based on a condition change in one or more cells associated with a table (e.g., a rule notifying a supervisor when a task is complete). The plurality of tools may be presented to the entity through a user interface, such as a web page, a mobile-application interface, a software interface, or any graphical interface that enables interactions between a human and a machine. Manipulating data in the table may refer to adding, removing, rearranging, and/or modifying information contained in cells, columns, rows, tables, dashboards, widgets, templates, and/or any other data structure associated with the table, or it may refer to adding, removing, and/or modifying rules associated with the table.

Figure 4:
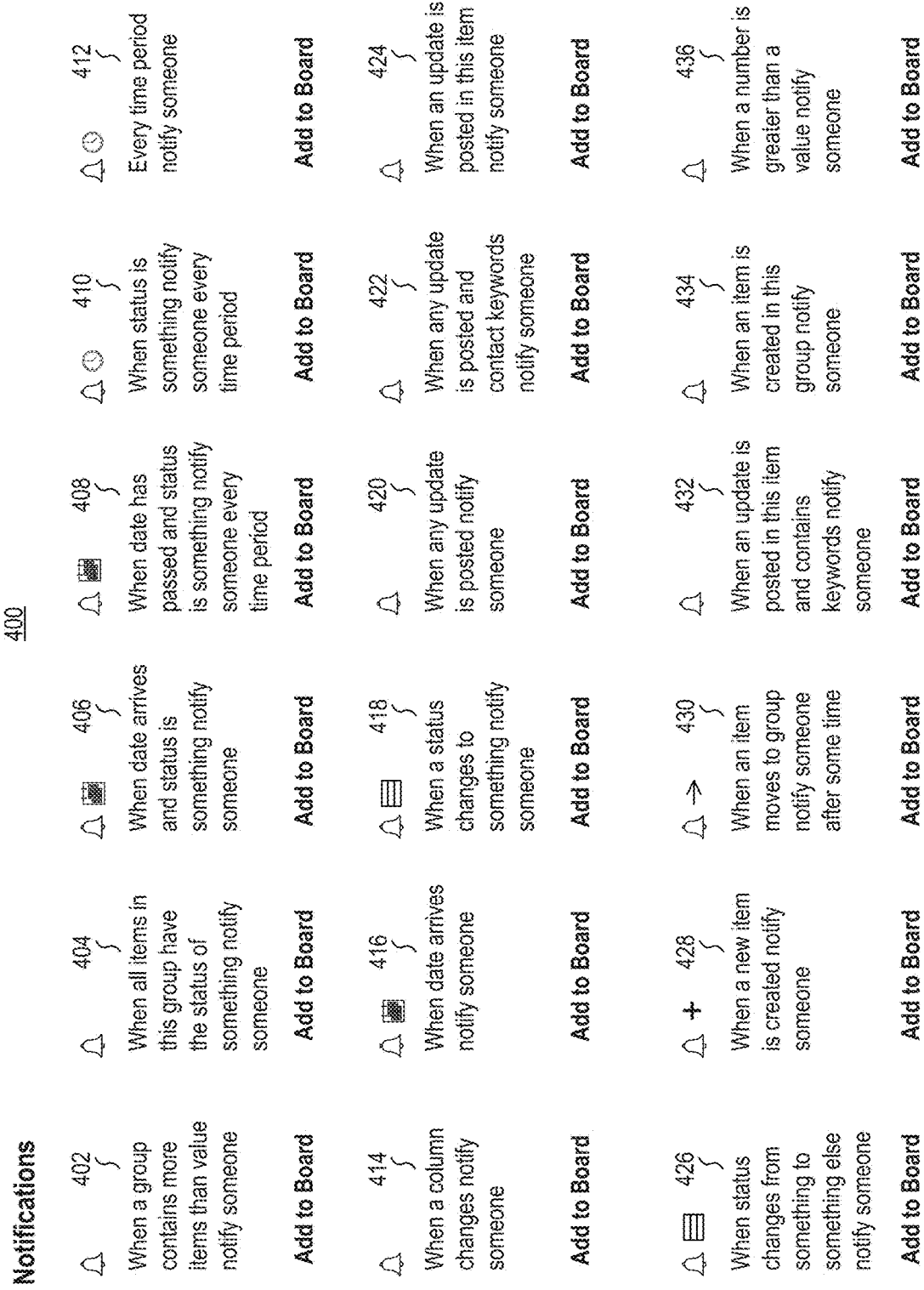
FIG. 4 illustrates an example of a logical rule notification interface, consistent with some embodiments of the present disclosure.

By way of example, a plurality of tools may be presented to an entity via table 300, as illustrated in FIG. 3. As discussed above, table 300 may be presented using a computing device (e.g., the computing device 100 illustrated in FIG. 1), software running thereon, or any other projecting device (e.g., projector, AR or VR lens, or any other display device). By utilizing a user interface associated with table 300, an entity may utilize a plurality of tools for manipulating data within table 300. For example, an entity may type notes directly into notes column 308 (e.g., "Document Filed" in the bottom cell) or modify a date in due date column 312. An entity may also manipulate data in the table by integrating one or more rules, for example by adding a rule that sends an email to an entity associated with table 300 when a due date in column 312 has passed. For example, FIG. 4 illustrates an example of a logical rule notification interface 400, consistent with some embodiments of the present disclosure. Rule notification interface 400 shows a visual approach to software where users do not need to have any knowledge of coding to setup specific rules for notifications. Rule notification interface includes notification rules 402 to 436. These exemplary automations or logical rules may, when selected, enable a user to configure a communications rule for table 300, for example. The user may also enable multiple communications rules for a single table or may enable one or more communications rules applicable to a plurality of tables.

Aspects of this disclosure may involve monitoring tool usage by an entity to determine at least one tool historically used by the entity. Tool usage by an entity may refer to the implementation, by the entity, of one or more tools to a single table or in a plurality of tables and may be recorded in one or more data structures associated with disclosed embodiments. Monitoring tool usage may include reviewing and/or analyzing one or more metrics associated with an entity's use of one or more tools and may refer to monitoring an entity's tool usage in a single table or in a plurality of tables. For example, the system may analyze the frequency in which a tool is used with a count in a period of time. The system may analyze the frequency in which a tool is used in context of other information and logical rules contained in the table to also determine how the tool is used in relation to other information or logical rules. In some embodiments, monitoring tool usage may include monitoring a count of each instance each tool is used. A count of each instance each tool is used may refer to a total amount of times a specific tool has been implemented or a frequency at which a specific tool is implemented by the entity. Additionally or alternatively, in some embodiments, monitoring tool usage may include monitoring combinations of the at least one tool historically used by the entity. Combinations of the at least one tool historically used by the entity may refer to one or more metrics related to other tools that have been used in association with the historically used tool. In some embodiments, monitoring combinations may include monitoring a count for each combination in a plurality of combinations. Monitoring tool usage may also include monitoring the nature of an entity's interactions with certain tools, for example by performing a semantic analysis of text entered by the entity directly into text columns. By way of some non-limiting examples, monitoring an entity's tool usage may include monitoring how many times a specific notification rule is implemented (e.g., a rule that notifies an entity when a due date has passed), monitoring how often one column type is used with another column type, or monitoring how often an entity sorts a particular column in a table.

For example, in FIG. 3, an entity may interface (e.g., with user device 220-1, user device 220-2, user device 220-m of FIG. 2) with table 300. At least one processor (e.g., processing circuitry 110 in FIG. 1) may be configured to monitor the interactions between the entity and table 300 for tool usage and store the usage data in at least one data structure (e.g., repository 230-1 to 230-n). The usage data, for example, may include language entered into notes column 308 (e.g., "Working on it", "Assistance Required", "Document Filed"). At a time when the entity adds start date column 310 and due date column 312, the at least one processor may be configured to update a count stored in at least one data structure associated with each column type, and to further update a count associated with the combination of each column type.

Some disclosed embodiments may include comparing an at least one tool historically used by an entity with information relating to a plurality of tools to thereby identify at least one alternative tool in the plurality of tools whose substituted usage is configured to provide improved performance over the at least one historically used tool. An alternative tool may include any tool in the system that an entity is not currently utilizing or a tool in the system that the entity has not utilized often. The alternative tool may provide increased performance over another tool, for example, by its relative ease of use, increased automation, its capabilities, and/or computational efficiency. By way of non-limiting example, a status column may provide increased efficiency over use of a "notes" column due to due to a higher time spent by interacting with the text column (e.g., by typing). In another example, a table may be associated with a large number of tools to accomplish a single function that can be accomplished by a single alternative tool or a smaller number of alternative tools. Accordingly, the alternative tools may improve the functioning of associated systems by increasing computational efficiency. The comparison may be based on, for example, at least one of a characterized function, capability, computational efficiency, or any other associated attribute of the at least one tool historically used and the plurality of tools. Characterized functions, capabilities, computational efficiencies, and any other associated attributes may be predefined for each tool, or they may be determined based on the monitored tool usage by applying machine learning and/or artificial intelligence to stored usage data.

A comparison may be performed, by way of non-limiting example, through the use of artificial intelligence. Artificial intelligence (i.e., machine learning), as described in more detail earlier, may refer to a system or device's ability to interpret data, to learn from such data, and/or to use such learnings to achieve specific goals and tasks through flexible adaptation. Artificial intelligence may integrate one or more methods such as brain simulation, symbol manipulation, cognitive simulation, logic-based algorithms, anti-logic or scruffy approaches, knowledge-based approaches, sub-symbolic approaches, embodied intelligence, computational intelligence, soft computing, statistical approaches, or any other approach that may be integrated to establish one or more cognitive capabilities of a system architecture, such as reasoning, problem solving, knowledge representation, planning, learning, natural language processing, perception, motion and manipulation, social intelligence, general intelligence, or any other form of simulated intelligence. Such artificial intelligence methods may be used to characterize at least one of a function, capability, computational efficiency, and any other associated attribute of a tool based on stored usage data.

By way of example, at least one processor (e.g., processing circuitry 110 in FIG. 1) may be configured to compare one or more tools associated with table 300 of FIG. 3 with a plurality of tools that may be integrated with table 300. For example, the at least one processor may apply artificial intelligence to notes column 308 to characterize the function of notes column 308. The artificial intelligence may be configured, in this example, to perform a semantic analysis of text columns to characterize their function and/or capabilities and may determine that notes column 308 frequently contains language related to a task status. Based on comparing this characterized function of notes column 308 with the plurality of tools, the at least one processor may determine that replacing notes column 308 with a status column would increase performance (e.g., by enabling a user to selected predefined variables instead of manually typing in the status). In another example, the at least one processor may be configured to analyze the data associated with the entity's historical use of due date column 312 to determine that the entity frequently uses due date column 312 with start date column 310. Based on this determination, the at least one processor may characterize the function of the combination as a timeline function and may determine that a timeline column would increase performance and processing efficiency (e.g., by reducing the number of columns).

In some embodiments, comparing may include performing semantic analysis of the table to identify a table context and wherein the at least one alternative tool may be identified at least in part on the table context. The semantic analysis may, as discussed above, involve artificial intelligence, and may be applied to column titles, logical sentence structures, task titles, or any other language data associated with the maintained table. For example, the semantic analysis may be configured to detect at least one language usage (e.g., words, numbers, symbols, dialect, language, phraseology, terminology, sentence structure) and associate the language use with at least one context and may determine a table context based on the at least one context. The at least one alternative tool may be identified at least in part on the table context due to an association between the table context and the at least one alternative tool. The table context may include any information contained in the table or as data associated with the table (e.g., metadata or account information). In some embodiments, the table context may be at least one of a field, vocation, task, or function. By way of example, a table context may relate to scheduling, and an alternative scheduling tool may be identified based on its association with the scheduling table context.

By way of example in FIG. 3, at least one processor (e.g., processing circuitry 110 in FIG. 1) may be configured to perform a semantic analysis on language usage in any and all cells of table 300, such as the cells in project column 302, person column 304, task details column 306, start date column 310, due date column 312, and each of the columns' title cells. In this example, artificial intelligence may be applied to determine that the table is associated with a legal context, at least based on terminology in the bottom of notes column 308 (i.e., "document filed"). Accordingly, at least one alternative tool may be identified based on its association with the legal context. For example, targeted document filing due date column may be identified as an alternative with the improved performance of increased workflow organization. In this example, the at least one processor determines the table context based on data contained in a single cell. However, it is understood that the semantic analysis as disclosed herein may be configured to determine at least one table context based on data contained in any number or combination of cells.

Disclosed embodiments may include presenting to the entity during a table use session a recommendation to use the at least one alternative tool. The recommendation to use the at least one alternative tool may be presented at any preconfigured or appropriate time or interface event, for example in a pop-up window, a webpage, or a drop-down menu, or other similar notification or prompting mechanisms associated with a user interface accessible with the entity. The recommendation may include information regarding the at least one alternative tool and/or provide an option to implement the tool via a suitable user interface. In some embodiments, for example, the recommendation may include information about a tool newly added to the plurality of tools (e.g., a newly developed tool introduced to the system), or it may include providing the entity with an identification of the improved performance (e.g., time saved, number of reduced columns, increased computational efficiency). In some embodiments, the improved performance of implemented recommendations may be monitored, stored such that improved performance statistics may be presented to or accessed by at least one entity with access rights to improved performance data (e.g., a table administrator, workflow specialist, or supervisor).

Consistent with some disclosed embodiments, presenting the recommendation may be threshold-based and may be displayed on any device as described previously. A threshold may refer to at least one unit associated with any usage metric as discussed herein, that when reached or exceeded by the usage metric triggers at least in part the presenting of the at least one alternative tool. For example, at least one processor may be configured to present the at least one alternative tool at a time when the monitored at least one historically used tool by the entity meets or exceeds a count, frequency, or a combination related threshold. In some embodiments, for example, a threshold may also be related to an entity affinity level associated with a tool that may be determined by applying artificial intelligence to the stored usage data.

Some disclosed embodiments may include presenting the at least one alternative tool at a time when the entity accesses the at least one historically used tool. As discussed above, presenting the at least one at any preconfigured or appropriate time or interface event, such as a threshold being met. Additionally or alternatively, the recommendation may be presented when a certain tool is accessed, for example a status column or a sorting tool. Accordingly, at least one tool may be presented one time or every time the historically tool is accessed if the at least one tool has been identified as an alternative tool that may increase efficiency over the historically used tool, or the at least one alternative tool may be presented at the first time the historically used tool is used after an associated usage threshold has been met.

Figure 5:
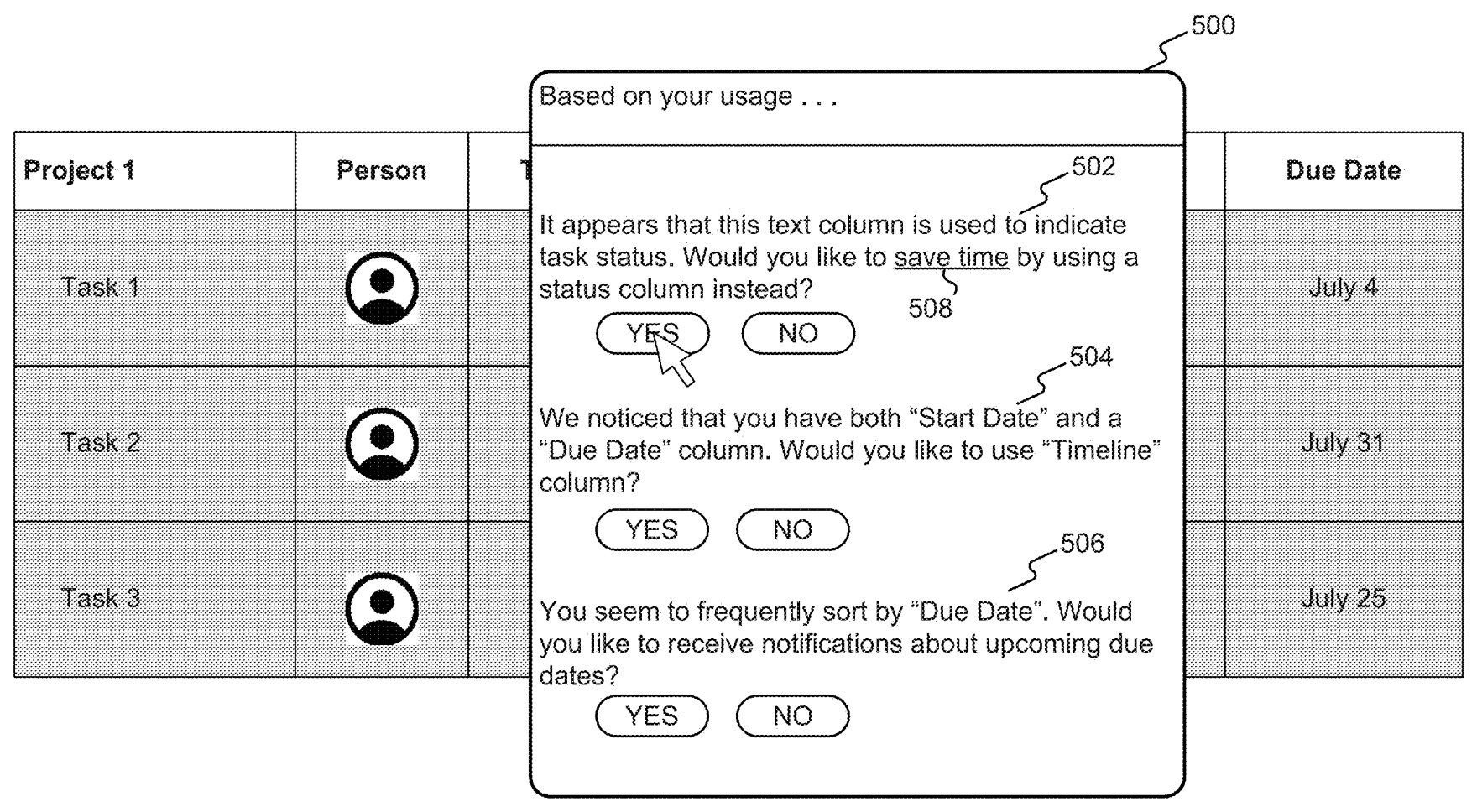

FIG. 5 illustrates an example of an interface 500 for enabling selection of multiple tool recommendations, consistent with some embodiments of the present disclosure. Interface 500 for example, may be presented based at least one threshold being met with regard to one of the historically used tools associated with recommendations 502, 504, and 506. Although interface 500 is illustrated as providing three recommendations, it is to be understood that any number of recommendations my be presented at a single time. In some embodiments, a user can hover over or click hyperlink 508 ("save time") to view one or more metrics of improved performance associated with adopting recommendation 502 (i.e., a status column) as an alternative to the historically used tool (i.e., a text column). Interface 500 may be presented, for example, based at least on a count of times an entity sorts by "Due Date" exceeding a threshold. Additionally or alternatively, interface 500 may be presented based on an entity accessing the sorting tool.

In some disclosed embodiments, the presented recommendations may include, via a user interface, options to accept or decline a specific recommendation. Accepting a specific recommendation may cause the associated alternative tool to be implemented in the current table, another table, or a plurality of tables, and declining a recommendation may prevent the associated alternative tool from being implemented whatsoever. Some embodiments may include, for example, identifying an instance where a specific recommendation is declined, and future presentation of the specific recommendation is thereafter disabled. Disabling future presentation may include removing the declined tool from the plurality of tools, intercepting the specific recommendation of the alternative tool from presentation, or otherwise preventing future presentation of the declined tool without affecting the ability of an entity to access the declined tool in the future (e.g., the entity may still access the declined tool). Additionally or alternatively, some embodiments may include a recommendation center (e.g., a webpage) that allows authorized entities to adjust recommendation settings, such as by promoting, blocking, or modifying certain recommendations.

By way of example, assume a user selects "YES" for recommendations 502 and 504 but selects "NO" for recommendation 506. Accordingly, the alternative tools associated with recommendations 502 and 504 may be automatically integrated into the table, whereas the alternative tool associated with 506 would not be integrated. In some embodiments, future presentation of recommendation 506 may be disabled based on being declined. By way of example, FIG. 6 illustrates an example of a table 600 with implemented tool recommendation according to this scenario, consistent with some embodiments of the present disclosure. As shown, table 600 may include status column 602 integrated because of an acceptance of recommendation 502 and timeline column 604 integrated because of an acceptance of recommendation 504. Not shown is that the alternative tool in recommendation 506 is not integrated in table 600 due to the recommendation being declined.

Some disclosed embodiments may include maintaining a list of restricted tools and withholding a recommendation to a use of a tool when the tool is on the restricted list. A list of restricted tools may refer to a list of tools maintained by an entity (e.g., an administrator, a service provider of disclosed systems, etc.), and may include tools restricted from a single entity and/or table or a plurality of entities and/or tables. An entity or table may be restricted from using a tool for example, based on a decision by an administrator, or it may be based on the table or entity not having unlocked the restricted tools. By way of some non-limiting examples, an entity may be restricted from a tool because they do not have a plan (e.g., a subscription) that allows for the use of such tools.

By way of example, in FIG. 5, recommendation 506 may not be included in interface 500 because the recommended tool is on a restricted list of tools associated with the entity. Alternatively, recommendation 506 may be included in interface 50, despite the recommended tool being on a restricted list associated with the entity. However, if the entity selects "YES" for recommendation 506, at least one processor may be configured to present to the entity information about a plan associated with the restricted tool in recommendation 506.

Figure 7:
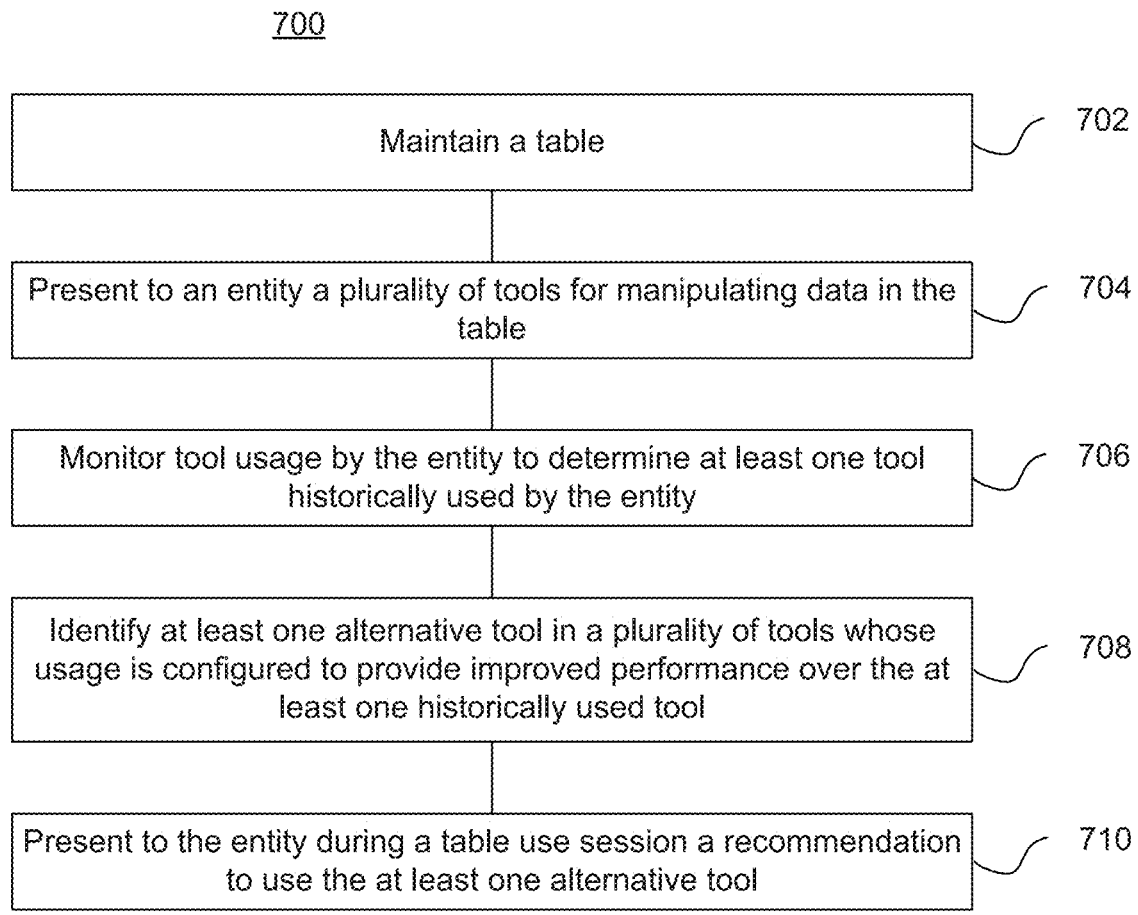
FIG. 7 illustrates a block diagram of an example process for self-monitoring software usage to optimize performance, consistent with some embodiments of the present disclosure.

FIG. 7 illustrates a block diagram of an example process 700 for self-monitoring software usage to optimize performance, consistent with some embodiments of the present disclosure.

Process 700 includes process blocks 702 to 710. At block 702, a processing means may maintain a table, as discussed previously in the disclosure above.

At block 704, the processing means may present to an entity a plurality of tools for manipulating data in the table, as discussed previously in the disclosure above.

At block 706, the processing means may monitor tool usage by the entity to determine at least one tool historically used by the entity, as discussed previously in the disclosure above.

At block 708, the processing means may identify at least one alternative tool in a plurality of tools whose usage is configured to provide improved performance over that at least one historically used tool. In some embodiments, identifying the at least one tool may be based on comparing the at least one tool historically used by the entity with information relating to the plurality of tools, as discussed previously in the disclosure above.

At block 710, the processing means may present to the entity during a table use session a recommendation to use the at least one alternative tool, as discussed previously in the disclosure above.

Disclosed embodiments may include systems, methods, and computer-readable media related to predicting required functionality and for identifying application modules for accomplishing the predicted required functionality.

An application module may refer to a logical combination of rules described herein or any other logical associations between cells, columns, rows, tables, dashboards, widgets, templates, and/or any other data structure or a combination thereof to provide a workflow in association with a table or other workspace. An application module may include a single logical sentence structure or a plurality of logical sentence structures that may be associated with a table. Exemplary application modules may include at least one logical sentence structure (e.g., automation) that triggers different actions when certain conditions are met. Application modules may include a plurality of automations that trigger various actions, thereby providing various functionalities. A functionality may include an output of an application module that may be triggered upon one or more conditions relating to a status of one or more data structures. For example, an application module (e.g., automation) may be configured to monitor a condition and to determine if a particular status is "complete" before the application module triggers an action of archiving a completed task. This application module may be said to include an archiving functionality. Predicting a required functionality may include an analysis, comparison, or any other lookup of characteristics associated with a table to determine commonly associated functions of the table. For example, where a table is organized with team members and contact information (e.g., email addresses, phone numbers, or any other contact information), the system may be configured to predict that the author of the table may desire to adopt an application module with a notification functionality (e.g., an automation that triggers an email to be sent to certain team members).

FIG. 8 illustrates an example of a table 800 that may include multiple columns, consistent with embodiments of the present disclosure. In some embodiments, table 800 may be displayed using a computing device (e.g., the computing device 100 illustrated in FIG. 1), software running thereon, or any other projecting device (e.g., projector, AR or VR lens, or any other display device) as previously discussed. For example, in some embodiments, an application may be configured to transmit information to at least one user device or modify data contained in one or more data structures. The table 800 may be associated with a project and may include, in the multiple rows and columns, tasks (e.g., in rows including "Task 1," "Task 2," or "Task 3") included in the project, persons (e.g., in a column 812) assigned to the tasks, details (e.g., in a column 814) of the tasks, statuses (e.g., in a column 802) of the tasks, due dates (e.g., in a column 806) of the tasks, timelines (e.g., in a column 810) of the tasks, or any information, characteristic, or associated entity of the project. In some embodiments, table 800 may be associated with one or more application modules. For example, table 800 may be associated with an application module that is configured to perform the functionality of sending a notification to a user device associated with one or more persons in column 812 when one or more statuses in column 802 changes. Application modules may be applied to exemplary table 800 and required functionalities may be predicted based on what is contained in table 800. For example, table 800 includes a status column 802, due date column 806, and person column 812. In response to detecting these column types, the system may predict that the owner of table 800 may require functionality to send an alert to individuals assigned in the person column 812 regarding tasks that do not yet have a "Done" status as a certain due date approaches a current date. The application modules may be predicted and recommended according to aspects of this disclosure discussed in further detail below.

Disclosed embodiments may include outputting a logical sentence structure template for use in building a new application module. A logical sentence structure (e.g., an automation) may include a logical organization of elements for implementing a conditional action. In some embodiments, the logical sentence structure may include a semantic statement or a rule (e.g., a sentence) that may be used to represent a functionality of a new application module. Logical sentence structures may be used to monitor conditions in a single table, in multiple tables of a single user, or multiple tables across multiple users. Further, logical sentence structures may be implemented to trigger actions in the single table or multiple tables of a single or multiple users. A logical sentence structure template may refer to a logical sentence structure in a template format that may be ready for configuration by the system of a user.

Figure 9:
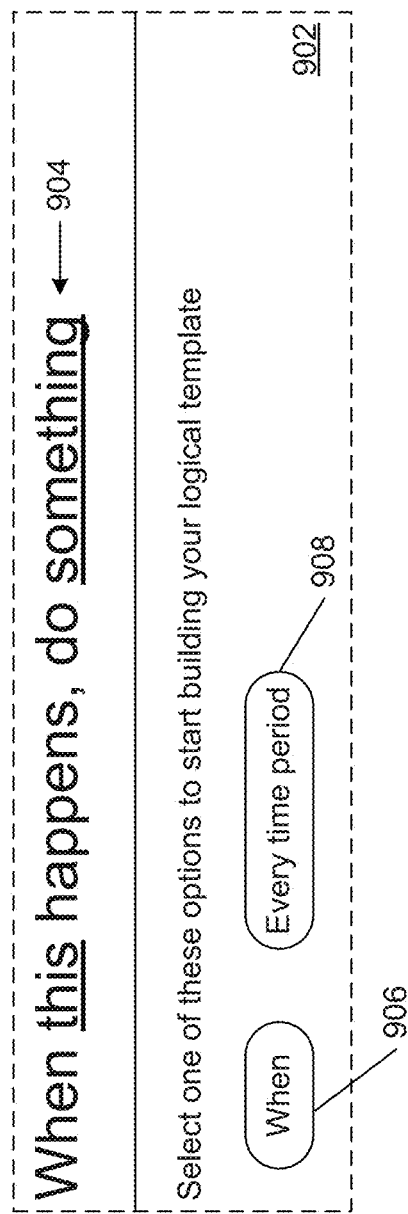
FIG. 9 illustrates an example of a logical sentence structure template displayed in a user interface, consistent with some embodiments of the present disclosure.

By way of example, FIG. 9 illustrates an example of a logical sentence structure template 904 displayed in a user interface 902, consistent with some embodiments of the present disclosure. As illustrated in FIG. 9, the user interface 902 involves the content presented in the outer dash-line rectangle. In some embodiments, the user interface 902 may be displayed using a computing device (e.g., the computing device 100 illustrated in FIG. 1) or software running thereon. For example, the user interface 902 may be a portion of a graphical user interface (GUI), such as a webpage or a mobile application GUI displayed on a screen of the computing device 100. Logical sentence structure template 904 may be presented as a sentence with pre-defined and definable variables. As shown in FIG. 9, the definable variables are underlined and are configurable by a user or system to provide definition from an associated table.

In some embodiments, the logical sentence structure template may include a plurality of definable variables that when selected result in a logical sentence structure delineating a function of the new application module. A definable variable may refer to a variable element of the logical sentence structure that may be selected and/or modified based on a user input. In some embodiments, a definable variable may include a status of one or more cells, columns, rows, tables, dashboards, widgets, templates, and/or any other data structure. In some embodiments, a definable variable may also include an event (e.g., a conditional action such as sending a notification, sending an email, archiving a task, or any other action) that is to be triggered once a certain condition is satisfied. An event may include sending a notification, modifying data in at least one data structure, or any other action that the new application module may be configured to execute when one or more conditions are satisfied. The event or conditional action of a logical sentence structure, alone or in combination with other events or conditional actions or the same or additional logical sentence structure, may be said to delineate a function of the new application module (e.g., a single or combination of logical sentence structures) by characterizing and providing the function of the logical sentence structure that is associated with a new application module (e.g., a workflow). For example, in some embodiments, one or more variables associated with a status of one or more data structures, and another one or more variables associated with one or more events may be defined in the logical sentence structure such that a functionality of the associated new application module is to trigger the one or more events upon a change of the one or more statuses in the one or more data structures.

Figure 10:
FIG. 10 illustrates a first view of an example of an interface for enabling selection of multiple variables in a logical sentence structure template, consistent with some embodiments of the present disclosure.

By way of example, FIG. 10 illustrates an example of a logical sentence structure template 1001 in which a user may define a plurality of definable variables. For example, a user may click on any of the various definable variables (may be referred to as user-definable requirements) including "status" variable 1003, "something" variable 1005, "email" variable 1007, or "someone" variable 1009 to delineate a function of the new application module. In this example, the "something" variable 1005 may be considered a condition used by the new application module to cause a result. The result itself in this example is defined by the email 1007 and someone 1009 variables that follow the conditions that serves to trigger the rule. In logical sentence structure template 1001, a status change automatically activates the rest of the logical sentence structure template to send a message to someone. The something 1005, email 1007 and someone 1009 may be user definable.

Disclosed embodiments may include receiving at least one input for at least one of the definable variables. Receiving at least one input may refer to receiving a selection of one or more of the plurality of definable variables by a user or the system. The at least one input may include a selection of the variables via a pick list, or the variables may be completely definable by a user via a customized input (e.g., entering text through a keyboard or any other user interface).

Figure 11:
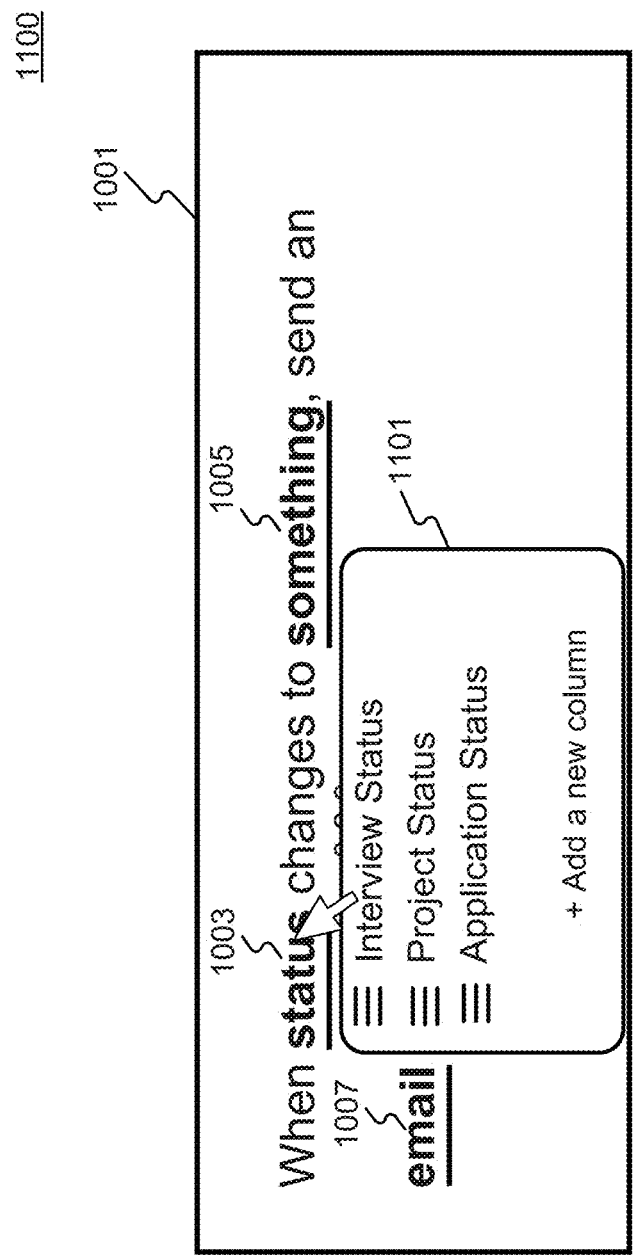
FIG. 11 illustrates a second view of an example of an interface for enabling selection of multiple variables in a logical sentence structure template, consistent with some embodiments of the present disclosure.
Figure 12:
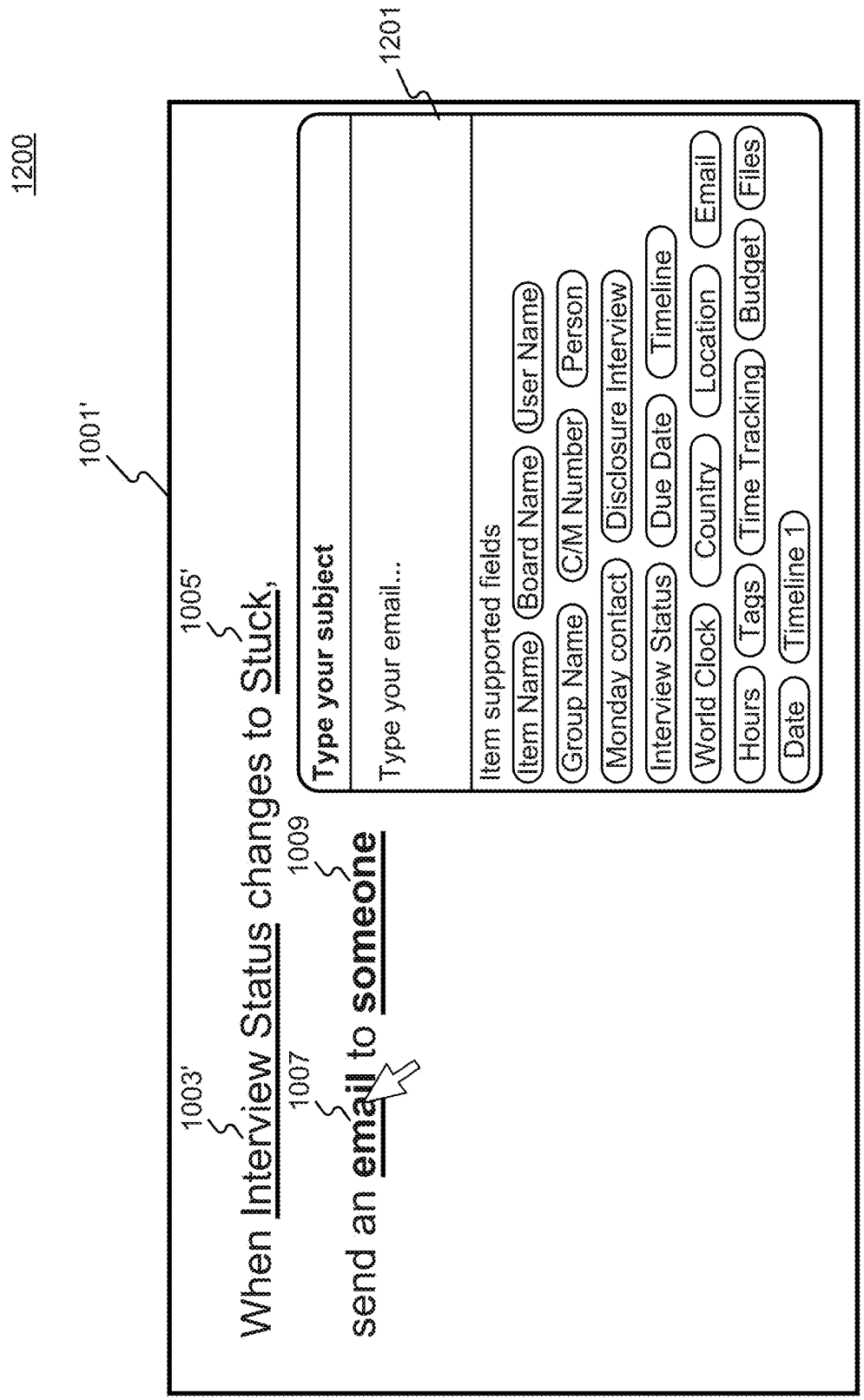
FIG. 12 illustrates a third view of an example of an interface for enabling selection of multiple variables in a logical sentence structure template, consistent with some embodiments of the present disclosure.

By way of example, a user may define the condition "done" for "something" variable 1005 and a custom or pre-defined message for the "email" variable 1007 in FIG. 10. In FIG. 11, the user may define "status" variable 1003 by clicking on "Interview Status," "Project Status," or "Application Status" from pick list 1101 (e.g., available status columns with differing headings from the underlying table). Further, a user may define the "status" variable 1003 by generating a new input previously unavailable in the pick list 1101 (e.g., defining a new column). In FIG. 12, however, a user may define email 1007 by typing in a subject and body of the email in window 1201.

Disclosed embodiments may include performing language processing on a logical sentence structure including at least one received input to thereby characterize the function of a new application module. Language processing may refer to rule-based methods, statistical methods, neural natural language processing methods, semantics look-up, or any other processes relating to the computer processing and analysis of any amount of language data. Language processing may enable computerized systems to perform a wide range of language processing tasks, such as text and speech processing, morphological analysis, syntactic analysis, lexical semantics, relational semantics, discourse, higher-level natural language processing applications, or any other computerized emulation of intelligent behavior and apparent comprehension of language. In some embodiments, the language processing may be based on the logical sentence structure and/or its template and the selected or unselected variables contained therein. Characterizing the function of the new application module may include determining or delineating a function (e.g., a conditional action or event), an intended function, and/or a potential function of the new application module based on one or more results of the natural language processing. For example, the system may perform language processing on a logical sentence structure that contains variables and actions for sending notifications or email messages. As a result of processing the language in the logical sentence structure to include an "email" variable or "notify" variable, the system may characterize the function of the new application module to be one of messaging, notification, or communication.

In some embodiments, language processing on the logical sentence structure may include identifying function-related words used in the logical sentence structure. A function related word may include one or more words associated with one or more objectives or functions of a new application module, such as "send message," "archive," "move to table," or any other action associated the function of a logical sentence structure.

In some embodiments, the language processing may involve artificial intelligence for determining an objective of the logical sentence structure. Artificial intelligence may refer to a system or device's ability to interpret data, to learn from such data, and/or to use such learnings to achieve specific goals and tasks through flexible adaptation. Artificial intelligence may integrate one or more methods such as brain simulation, symbol manipulation, cognitive simulation, logic-based algorithms, anti-logic or scruffy approaches, knowledge-based approaches, sub-symbolic approaches, embodied intelligence, computational intelligence, soft computing, statistical approaches, or any other approach that may be integrated to establish one or more cognitive capabilities of a system architecture, such as reasoning, problem solving, knowledge representation, planning, learning, natural language processing, perception, motion and manipulation, social intelligence, general intelligence, or any other form of simulated intelligence. Such artificial intelligence methods may be used to determine one or more objectives associated with the logical sentence structure, which may further be utilized to characterize a function of the new application module.

As illustrated in FIG. 10, the logical sentence structure template includes undefined variables "status" 1003, "something" 1005, "email" 1007, and "someone" 1009. The system may be configured to perform language analysis on the undefined logical sentence structure template and determine that the function of the new application module 1001 is one of communication or emailing, based on the language processing of the undefined "email" variable 1007. The language processing may be performed on a fully defined logical sentence structure template (e.g., a logical sentence structure or automation) and perform a similar analysis to determine that the characterized function of the new application module is one for communication or emailing.

By way of other examples, disclosed systems, methods, and computer readable media may be configured to perform natural language processing on the logical sentence structure template illustrated in FIG. 12. The natural language processing may be based on, for example, "status" variable 1003, "something" variable 1005, "email" variable 1007, or "someone" variable 1009 that have or have not been selected, and may identify one or more function-related words in logical sentence structure template 1001, such as "changes" or "send". The natural language processing may apply artificial intelligence on logical sentence structure template 1001, the variables contained in logical sentence structure template 1001, and/or the identified function-related words in logical sentence structure template 1001. The artificial intelligence may be used, in this example, to determine that an objective of the logical sentence structure is to monitor status variable 1003 and/or to notify an individual associated with someone variable 1009, and may further be used to determine that the intended function of the new application module is to send a specific email to an individual when an interview status changes to stuck.

In some embodiments, the language processing may be performed on the logical sentence structure before less than all the variables of the logical sentence structure are selected. For example, a logical sentence structure template may include several selectable variables. However, disclosed embodiments may choose to not require each of the several selectable variables to be selected by a user before performing language processing on the logical sentence structure. Language processing may be performed at any point prior to, during, or after selection of each selectable variable of the logical sentence structure and may be said to be performed before less than all of the variables of the logical sentence structure are selected. Performing language processing before less than all of the variables are selected may provide an anticipatory effect of determining function of an application module, in that the system may anticipate the function of the application module and may provide suggestions for how to complete the remainder of the application module or logical sentence structure template (e.g., an automation template or partially defined automation template), as further discussed below.

In some embodiments, language processing may be performed on a logical sentence structure before less than all of the plurality of variables are input, and wherein the function is estimated based on less than an input of all the variables. For example, a logical sentence structure template may include several selectable variables. However, disclosed embodiments need not require each of the several selectable variables to be selected by a user before estimating a function of the logical sentence structure. In one sense, estimation of a function of the logical sentence structure may include performing an analysis (e.g., a language processing analysis) of the logical sentence structure or logical sentence structure template and determining at least one function that may be associated with the logical sentence structure at any point prior to, during, or after selection of each selectable variable in a plurality of selectable variables in the logical sentence structure.

In some embodiments, a characterization of the function of a new application module may be generated before all the plurality of variables are selected. For example, a new application module may include a logical sentence structure template with several selectable variables. However, disclosed embodiments need not require each of the several selectable variables of the logical sentence structure template to be selected by a user before characterizing a function of the new application module (e.g., the workflow). In one sense, characterizing a function of the new application module may include performing an analysis (e.g., a language processing analysis) and determining the function based on the characterized function of the logical sentence structure at any point prior to, during, or after selection of each selectable variable in a plurality of selectable variables in the logical sentence structure.

By way of example, FIG. 12 provides an illustration of a logical sentence structure template 1001' in which all of the plurality of variables have not been selected. At the point in time illustrated in FIG. 12, "Interview Status" input 1003' is selected for "status" variable 1003, and "Stuck" input 1005' is selected for "something" variable 1005. However, "email" variable 1007 and "someone" variable 1009 remain unselected (e.g., undefined). At this particular point in time, disclosed embodiments may be configured to perform language processing on the logical sentence structure, estimate a function of the logical sentence structure, characterize a function of the new application module, and/or perform any other disclosed steps related to the analysis of the logical sentence structure.

In some embodiments, characterization of a function of a new application module may include examination of a table associated with a logical sentence structure. A table associated with the logical sentence structure may include, for example, a table or any other data structure that may contain data in one or more rows, columns, cells at intersections of rows and columns, or any other data field related to a selectable variable, trigger, and/or function associated with the logical sentence structure. In some embodiments, a table may be associated with the logical sentence structure and may provide the underlying information for including in the logical sentence structure template when the logical sentence structure template is generated and/or selected while the user is accessing the table. In some embodiments, the table associated with the logical sentence structure may include any table associated with the user or user account. Examination of a table associated with the logical structure may include assessing data and/or one or more variables contained in one or more rows, columns, and/or other data field of the table or preestablished application modules associated with the table in order to characterize the function of the new application module. For example, a table associated with the logical sentence structure may be examined to identify data contained in the table, and the characterized function of the new application module may be a function related to the data.

By way of example, FIG. 12 provides yet another illustration of logical sentence structure template 1001'. The characterization of a function of a new application module associated with logical sentence structure template 1001' may include an examination of a table (not shown) associated with logical sentence structure template 1001'. For example, table 800 illustrated in FIG. 8 may be associated with logical sentence structure template 1001 because a user initiated the generation of the logical sentence structure template while accessing table 800, or the user may have selected a variable in logical sentence structure template 1001 that is associated with data contained in one or more fields of table 800. For example, "Interview Status" 1003' may correspond with column 802, and characterization of the function of logical sentence structure template 1001' may include an examination of table 800 as an associated table. The examination of table 800 may include reviewing and/or analyzing rows and columns to determine their relationships, which may be used to determine and/or characterize the function of logical sentence structure template 1001'. For example, the function of logical sentence structure template 1001' may be characterized as communication or notifying an individual (e.g., an individual or any other entity) when a status in column 802 changes. The "someone" variable 1009 may be any individual or any other entity, such as a supervisor or another team member.

Disclosed embodiments may include comparing the characterized function of the new application module with pre-stored information related to a plurality of predefined application modules. The pre-stored information may include any information or data that may be stored in a database or any other data structure associated with disclosed embodiments, and may include information such as variables, objectives, triggers, action, functions, or any other information associated with predefined application modules. Predefined application modules may include any number of application modules that have been preconfigured by disclosed systems to perform any number of actions based on one or more triggers or serve any function associated with embodiments of the present disclosure. By storing predefined application modules associated with pre-stored information, the system may compare a user's application module to a library of predefined application modules to find common characteristics and functions associated with similar application modules to that of the user's application module.

By way of example, a characterized function of logical sentence structure template 1001 in FIG. 12 may be to send a notification email to an individual or entity when "Interview Status" 1003' changes to "Stuck" 1005', which may characterize the functionality of this particular application module. This characterized function of the particular application module may be compared to one or more functions of a plurality of predefined application modules (e.g., a library of predefined application modules). For example, one predefined application module may have a comparable function of sending an email with a predefined script to a supervisor when a status of a particular column changes. The system may characterize the application module including the logical sentence structure template 1001' of FIG. 12 as having a notification function and compare this function against a stored repository of sample application modules that may be commonly associated with notification-based functionality.

Disclosed embodiments may include determining at least one similarity of a characterized function (e.g., of a new application module) to a specific predefined application module. A similarity may be determined between any form of information associated with the characterized function of the new application module and the predefined application module (e.g., a stored application module in a library for look-up). For example, the new application module and a predefined application module may have at least one similarity between variables, triggers, and/or actions associated with each application module. In some embodiments, the at least one similarity may include at least one of a similarity in a word or an objective. For example, each of the new application module and the predefined application module may contain the same word in a logical sentence structure associated with each respective application, or each respective application module may have one or more similar objectives. An objective may include a determined or estimated functionality of an application module based on at least one logical sentence structure associated with an application module, consistent with some embodiments of the disclosure.

By way of example, a characterized function of logical sentence structure template 1001' in FIG. 12 may be to send a notification email to an individual or entity when "Interview Status" 1003' changes to "Stuck" 1005', resulting in the characterized function of the new application module (e.g., the workflow associated with the logical sentence structure template 1001' of FIG. 12) as sending an email with a predefined script to an individual or entity when a status of a particular column changes. The system may perform a look-up in a repository of predefined application modules for specific application modules that share a similarity to the function of new application module (e.g., sending an email in response to a status change). Some examples of similarities between the characterized function of the new application module and the predefined application modules (e.g., prestored in a repository) may include similar triggers (i.e., the status variable) and similar actions (i.e., sending an email). The subject of the similar actions (e.g., John Doe for the characterized function of the new application module)

may also be a similarity between each respective, prestored application module because each subject is associated with a supervisor role. Additionally, the predefined application module (e.g., prestored in a repository) may each be associated with at least one logical sentence structure that includes one or more similar words to those included in logical sentence structure template 1001' of the new application module, such as "when . . . changes" or "send," which may also be an identified similarity between the characterized function of the new application module and the predefined application module.

Disclosed embodiments may include presenting a specific predefined application module as an adoptable alternative for accomplishing a function. Presenting the specific predefined application module may include generating a pop-up window on a graphical user interface that may prompt the user for an input for whether the user would like to use the predefined application module as an alternative, or it may include any other prompt. In some embodiments, more than one specific predefined module may be presented at the same time. For example, in some embodiments, determining at least one similarity may include generating a similarity score between the characterized function of the new application module and a plurality of predefined application modules, and disclosed embodiments may be configured to present a particular or a group of predefined application modules that meet and/or exceed a specific threshold similarity score. In some embodiments, once the specific predefined application module is presented, disclosed embodiments may be configured to implement the selected predefined application module upon selection of predefined application module by a user through a user interface.

Figure 13:
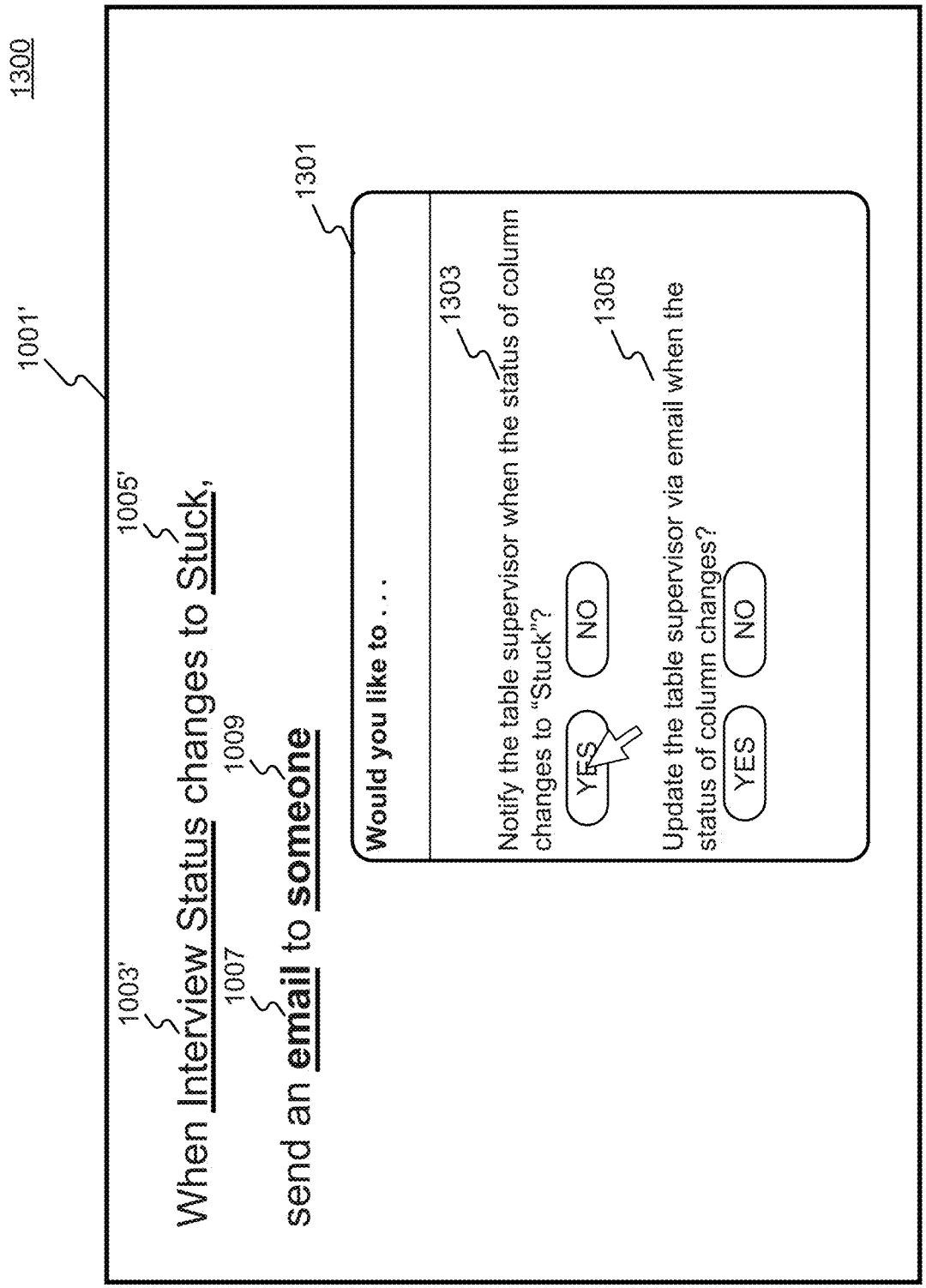
FIG. 13 illustrates a fourth view of an example of an interface for enabling selection of multiple variables in a logical sentence structure template, consistent with some embodiments of the present disclosure.

By way of example, FIG. 13 provides an illustration of logical sentence structure template 1001', where window 1301 presents two options delineating the function of adoptable alternatives for accomplishing the characterized function of logical sentence structure template 1001' of a new application module, including adoptable alternatives as a first option 1303 and a second option 1305. Upon reviewing the information contained in window 1301, a user may choose to adopt one of first option 1303 and second option 1305 and select "YES" under one or both of the two options. Once at least one of options 1303 and 1305 is selected, the selected option may be implemented as part of the new application module consistent with some embodiments of the disclosure. Although FIG. 13 only illustrates options that are selectable with "YES" and "NO" icons, it is to be understood that any number of adoptable alternatives may be presented that may be selected through any suitable interaction with a user.

Figure 14:
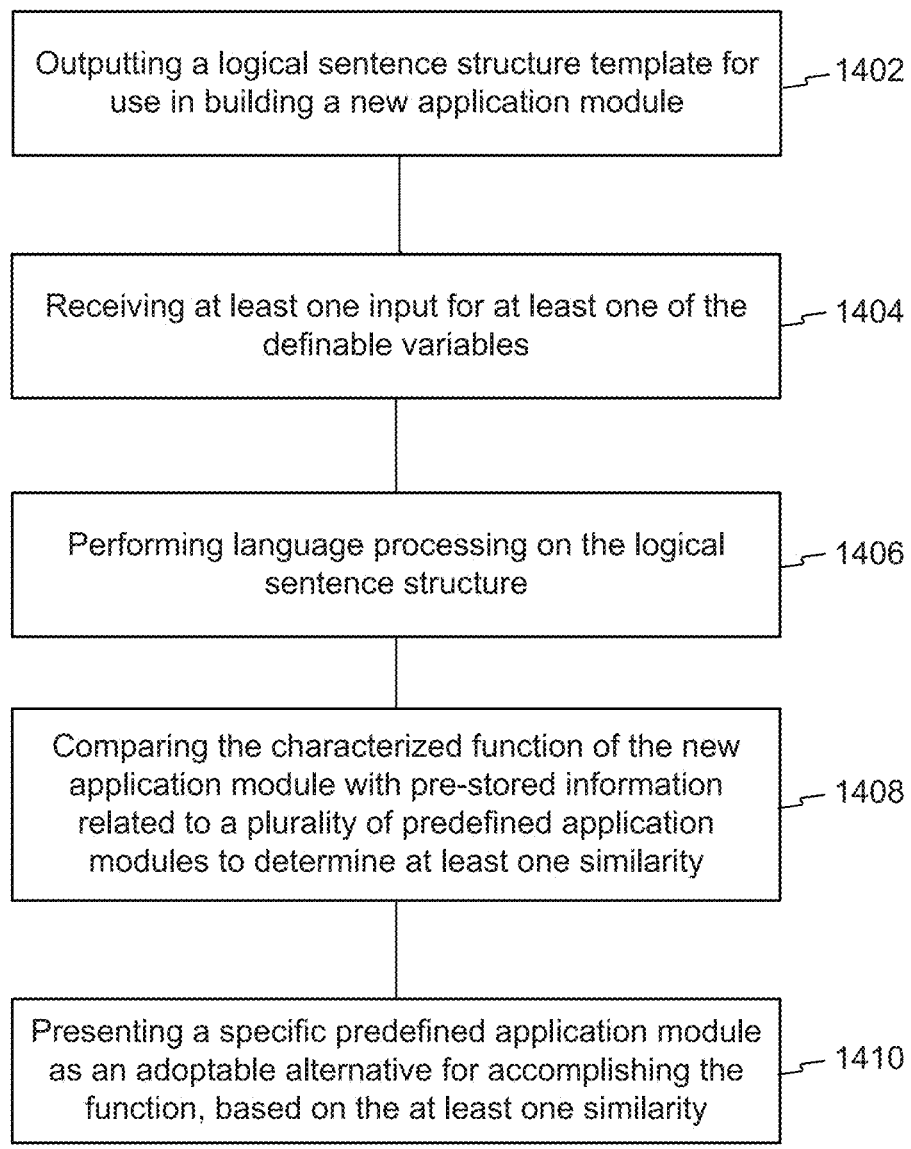
FIG. 14 is a block diagram of an exemplary process for predicting required functionality and for identifying application modules for accomplishing the predicted required functionality, consistent with some embodiments of the present disclosure.

FIG. 14 illustrates a block diagram of an example process 1400 for predicting required functionality and for identifying application modules for accomplishing the predicted required functionality, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 1400 may be performed by at least one processor (e.g., the processing circuitry 110 in FIG. 1) of a computing device (e.g., the computing device 100 in FIGS. 1 and 2) to perform operations or functions described herein, and may be described hereinafter with reference to FIGS. 8 to 13 by way of example. In some embodiments, some aspects of the process 1400 may be implemented as software (e.g., program codes or instructions) that are stored in a memory (e.g., the memory portion 122 in FIG. 1) or a non-transitory computer-readable medium. In some embodiments, some aspects of the process 1400 may be implemented as hardware (e.g., a specific-purpose circuit). In some embodiments, the process 1400 may be implemented as a combination of software and hardware.

FIG. 14 includes process blocks 1402 to 1410. At block 1402, a processing means may output a logical sentence structure template for use in building a new application module. The logical sentence structure template may include a plurality of definable variables that when selected, may result in a logical sentence structure delineating a function of the new application module, as discussed above.

At block 1404, the processing means may receive at least one input for at least one of the definable variables, consistent with the disclosure above.

At block 1406, the processing means may perform language processing on the logical sentence structure including the at least one received input to thereby characterize the function of the new application module, as discussed previously in the disclosure above.

At block 1408, the processing means may compare the characterized function of the new application module with pre-stored information related to a plurality of predefined application modules to determine at least one similarity to a specific predefined application module, as discussed previously.

At block 1410, the processing means may, based on the at least one similarity, present the specific predefined application module as an adoptable alternative for accomplishing the function, consistent with some embodiments of the disclosure as described above.

In electronic workflow systems for managing complex endeavors, it may be beneficial to employ a myriad of conditional rules for triggering actions when one or more conditions are met. Defining the triggers and the actions to maintain consistency within projects and across projects can be daunting when the possible combinations of triggers and actions could be endless. Therefore, there is a need for unconventional innovations for helping to ensure that endeavors are managed consistently and correctly.

Such unconventional approaches may enable computer systems to determine tools and functions that may be implemented to improve efficiency of project management software applications. By training a system to understand the types of tools and settings required to manage a particular project by learning from prior projects, by understanding a current project, and by identifying similarities, a system may recommend tools and settings to increase the efficiency and operations of workflow management functionality. Various embodiments of the present disclosure describe unconventional systems, methods, and computer readable media for associating a plurality of logical rules with groupings of data. Various embodiments of the present disclosure may include at least one processor configured to maintain a table containing columns, access a data structure containing the plurality of logical rules that when linked to columns, enable a table action in response to a condition change in a cell associated with a first particular logical rule linked to a first particular column. The at least one processor may be configured to access a correlation index identifying a plurality of column types and a subset of the plurality of logical rules typically associated with each column type and receive a selection of a new column to be added to the table. In response to the received selection, in some embodiments, the at least one processor may be configured to perform a look up in the correlation index for logical rules typically associated with a type of the new column, present a pick list of the logical rules typically associated with the type of the new column, receive a selection from the pick list, link to the new column a second particular logical rule associated with the selection from the pick list, and implement the second particular logical rule when data in the new column meets a condition of the second particular logical rule.

Thus, the various embodiments the present disclosure describe at least a technological solution, based on improvement to operations of computer systems and platforms, to the technical challenge of determining the most appropriate tools, functions, and rules to implement on a platform by an analysis of different groupings of data in a project management platform.

Disclosed embodiments may involve systems, methods, and computer-readable media for associating a plurality of logical rules with groupings of data. A logical rule may refer to a combination of one or more conditions, triggers, and/or actions that may be implemented with respect to disclosed systems, methods, and computer-readable media, or it may refer to any other logical associations between one or more groupings of data. A grouping of data may refer to cells, columns, rows, tables, dashboards, widgets, templates, and/ or any other data structure or a combination thereof to provide a workflow in association with a table or other workspace. An exemplary logical rule may include a plurality of automations that trigger various actions. For example, a logical rule (e.g., automation) may be configured to monitor a condition and to determine if a particular status is "complete" before the logical rule triggers an action of archiving a completed task.

Figure 15:
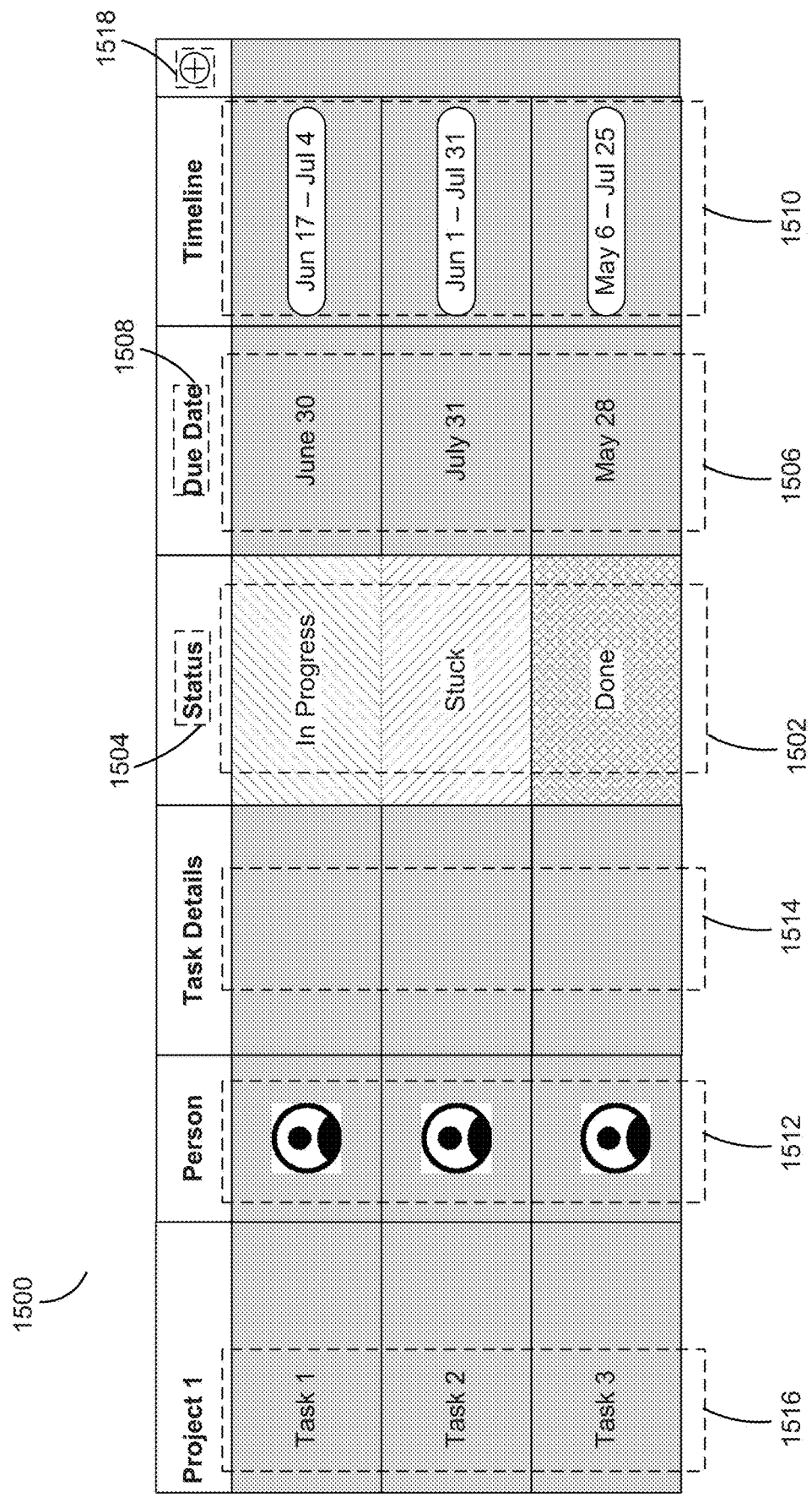
FIG. 15 illustrates an example of a table that includes multiple columns and rows, consistent with some embodiments of the present disclosure.

By way of example FIG. 15 illustrates an example of a table that includes multiple columns and rows, consistent with some embodiments of the present disclosure. In some embodiments, table 1500 may be displayed using a computing device (e.g., the computing device 100 illustrated in FIG. 1), software running thereon, or any other projecting device (e.g., projector, AR or VR lens, or any other display device) as previously discussed. For example, in some embodiments, an application may be configured to transmit information to at least one user device or modify data contained in one or more data structures. The table 1500 may be associated with a project and may include, in the multiple rows and columns, tasks (e.g., in rows including "Task 1," "Task 2," or "Task 3") included in the project, persons (e.g., in a column 1512) assigned to the tasks, details (e.g., in a column 1514) of the tasks, statuses (e.g., in a column 1502) of the tasks, due dates (e.g., in a column 1506) of the tasks, timelines (e.g., in a column 1510) of the tasks, or any information, characteristic, or associated entity of the project. In some embodiments, table 1500 may be associated with one or more logical rules. For example, table 1500 may be associated with a logical rule that is configured to perform the functionality of sending a notification to a user device associated with one or more persons in column 1512 when one or more statuses in column 1502 changes. Logical rules may be applied to exemplary table 1500 and required functionalities may be predicted based on what is contained in table 1500. For example, table 1500 includes a status column 1502, due date column 1506, and person column 1512. In response to detecting these column types, the system may predict that the owner of table 1500 may require functionality to send an alert to individuals assigned in the person column 1512 regarding tasks that do not yet have a "Done" status as a certain due date approaches a current date. The logical rules may be predicted and recommended according to aspects of this disclosure discussed in further detail below.

In some disclosed embodiments, each of the plurality of logical rules may include a logical sentence structure. A logical sentence structure (e.g., an automation template) may include a logical organization of elements for implementing a conditional action. In some embodiments, the logical sentence structure may include a semantic statement or a rule (e.g., a sentence) that may be used to represent a functionality of a new application module. Logical sentence structures may be used to monitor conditions in a single table, multiple tables of a single user, or multiple tables across multiple users. Further, logical sentence structures may be implemented to trigger actions in the single table or multiple tables of a single or multiple users. A logical sentence structure template may refer to a logical sentence structure in a template format that may be ready for configuration by the system of a user.

Figure 16:
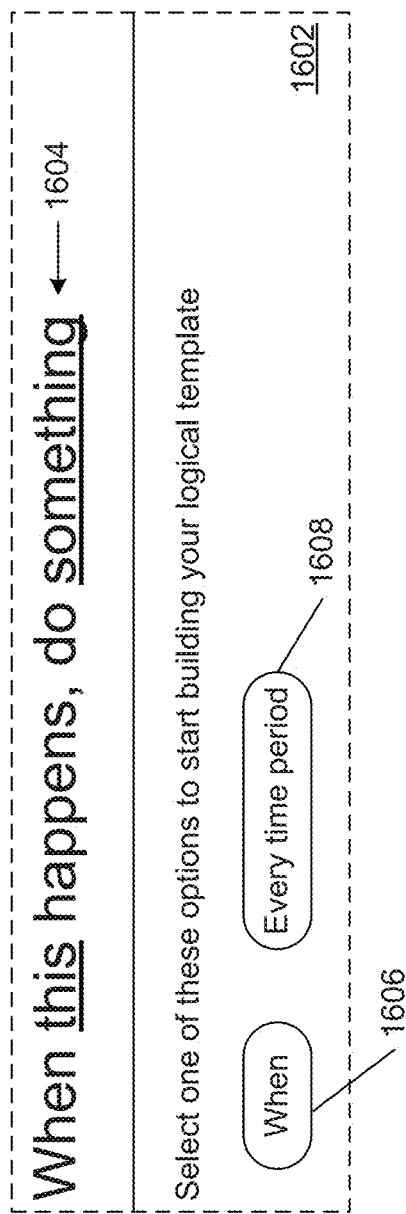
FIG. 16 illustrates an example of a logical sentence structure template displayed in a user interface, consistent with some embodiments of the present disclosure.

By way of example, FIG. 16 illustrates an example of a logical sentence structure template 1604 displayed in a user interface 1602, consistent with some embodiments of the present disclosure. As illustrated in FIG. 16, the user interface 1602 is represented as a dash-line box that does not necessarily represent its boundary. In some embodiments, the user interface 1602 may be displayed using a computing device (e.g., the computing device 100 illustrated in FIG. 1) or software running thereon. For example, the user interface 1602 may be a portion of a graphical user interface (GUI), such as a webpage or a mobile application GUI displayed on a screen of the computing device 100. Logical sentence structure template 1604 may be presented as a sentence with pre-defined and definable variables.

Disclosed embodiments may include maintaining a table containing columns, and accessing a data structure containing a plurality of logical rules that when linked to the columns, enable a table action in response to a condition change in a cell associated with a first particular logical rule linked to a first particular column. A data structure consistent with the present disclosure may include any collection of data values and relationships among them. The data structure may be maintained on one or more of a server, in local memory, or any other repository suitable for storing any of the data that may be associated with a plurality of rules and any other data objects. A table action may refer to one or more events that that occur based on data presented in a table and that may be triggered by a condition being satisfied. In some embodiments, the condition change in a cell may include a change of data in one or more cells. A change of data may include the addition, deletion, rearrangement, or any other modification or combination thereof. For example, a table action may include sending an e-mail or other notification when a status of a cell in a status column changes to "complete," or if all cells in a status column change to "complete." In some embodiments, the table action may include a change in data in the maintained table or in another table. A maintained table may refer to the table containing one or more cells, columns, rows, or any arrangement. Changing data in another table may include changing data in a table that is different from a subject maintained table, such as a table associated with another team or workspace, or another table of the same entity.

By way of example in FIG. 15, disclosed embodiments may include maintaining table 1500 containing project column 1516, person column 1512, task details column 1514, status column 1502, due date column 1506, and timeline column 1510. One or more data structures associated with table 1500 (e.g., in storage 130, repository 230-1, repository 230-n of FIGS. 1 and 2) may store a plurality of logical rules that may be linked to columns to accomplish one or more functionalities. There may be many logical rules each having different functionalities. For example, a first particular logical rule may be linked to a first particular column to cause first functionality when a condition of the first particular logical rule is met. One of such logical rules in the data structure may be to notify (i.e., via a table action) an individual when a due date is approaching (i.e., a condition change). When linked to table 1500, for example, this rule may cause a notification to be sent to someone in person column 1512 when their respective due date in due date column 1506 is approaching (e.g., within a few days). Another logical rule may be to update a timeline (i.e., a change in data) when a due date passes (i.e., a condition change). When linked to table 1500, this rule may cause a timeline in timeline column 1510 to be extended based on the corresponding due date in due date column 1506 passing. Yet another logical rule may be to update a status in a cell (i.e., a change in data) in another table if a due date passes (i.e., a condition change). When linked to table 1500, for example, this rule may cause a status in a cell of a separate table (e.g., a table limited to administrators or supervisors) to indicate that a task in task column 1516 is overdue.

Some embodiments may include accessing a correlation index identifying a plurality of column types and a subset of the plurality of logical rules typically associated with each column type. A correlation index may refer to at least one repository of stored relationships, typically relating differing pieces of information with each other. For example, a correlation index may relate column types, information in columns, or both. In some embodiments the correlation index may be manifest in the form of an artificial intelligence engine that accesses information about past relationships between information in tables or related tables to determine correlations between that information. By way of example only, a correlation index may determine that when two types of information are maintained in a particular type of table, a particular logical rule is regularly employed. The index may be accessible to perform a look up, to identify common logical rules that match features of one or more table structures. Disclosed systems may reference the correlation index to determine which logical rules in the plurality of logical rules may be associated with a certain column type. A column type may refer to classification of a column based on the type of data to be stored in column. Some non-limiting examples of columns include "status" columns, "text" columns, "people" columns, "timeline" columns, "date" columns, "tags" columns, and "numbers" columns. Each column type may have any number of logical rules associated with the column type, for example, by virtue of the data stored in each column type being associated with conditions or actions associated with the logical rules. In some embodiments, the correlation index may be stored in the data structure.

Figure 17:
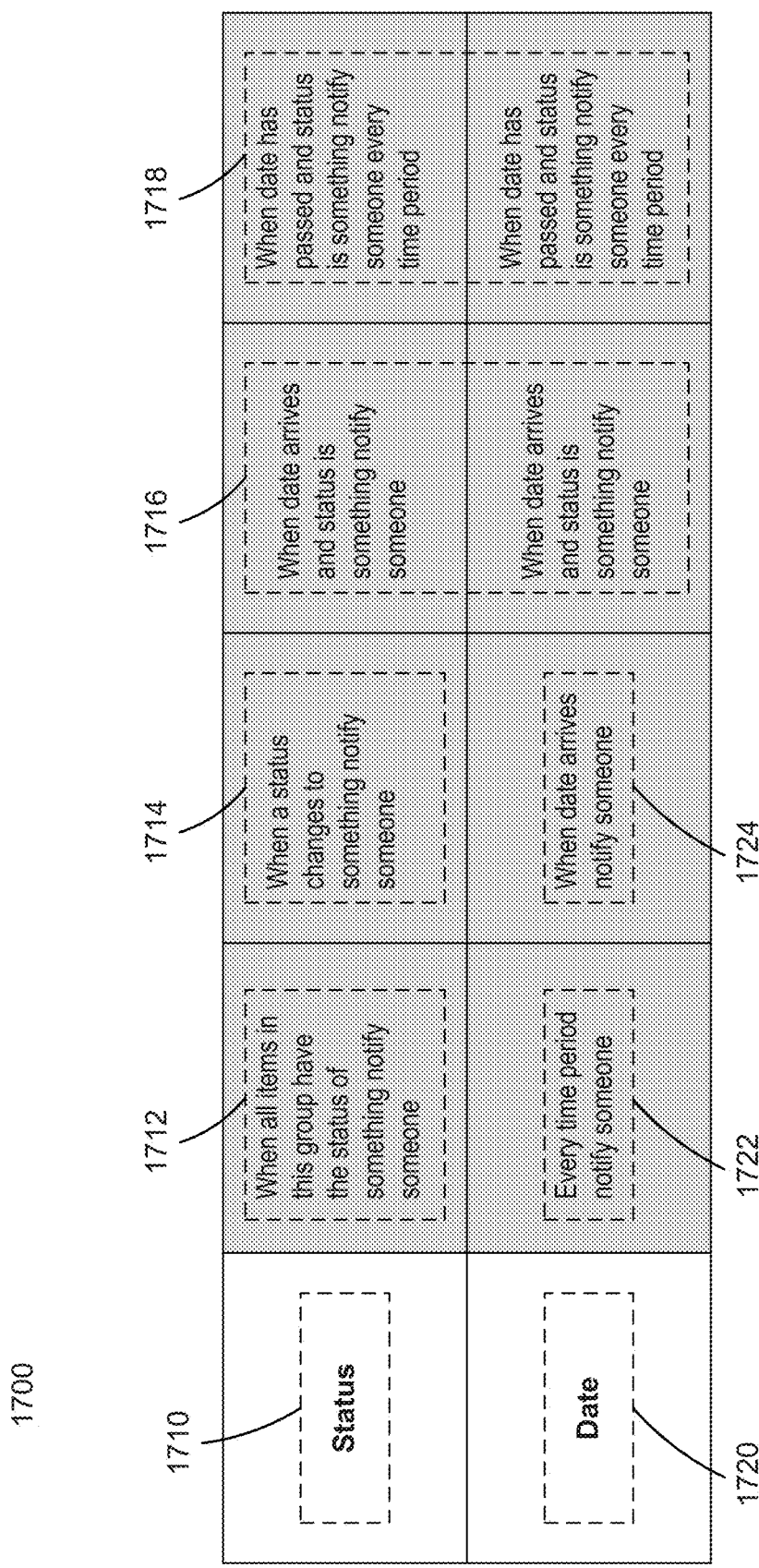
FIG. 17 illustrates a visual representation an exemplary correlation index, consistent with some embodiments of the present disclosure.

For discussion purposes, FIG. 17 illustrates a highly simplified visual representation an exemplary correlation index 1700, consistent with some embodiments of the present disclosure. For ease of discussion, correlation index 1700 is illustrated as maintaining a plurality of logical rules associated with a limited number of column types. It is to be understood, however, that correlation index 1700 may contain information related to any number of logical rules and/or any number of column types or any combination of multiple logical rules and multiple column types. Correlation index 1700 may include a plurality of logical rules that may be associated with status column type 1710 and date column type 1720. For example, status column type 1710 may be associated with logical rule 1712 and logical rule 1714, while date column type 1720 may be associated with logical rule 1722 and logical rule 1724. Some logical rules, such as logical rule 1716 and logical rule 1718, may be associated with more than one column type that may be linked together. For example, logical rule 1716 delineates "when date arrives and status is something notify someone." Because a certain date and a certain status are both conditions to notifying someone, this rule is associated with both status column type 1710 and date column type 1720.

Some disclosed embodiments may include generating a correlation index by inspecting preexisting linkages between preexisting columns and at least some of the plurality of logical rules. Inspecting preexisting linkages may include accessing one or more pre-established tables to determine one or more column types that are linked or otherwise associated together so that the system may determine which logical rules are typically associated with one or more linked column types. Preexisting linkages may be inspected within a single table, a specified number of tables, or all tables that may be associated with disclosed systems. For example, a status column and a date column may be linked because the combination of the columns may generate additional deadline information that relies on both columns. The system may determine that there is a preexisting linkage between a status column and a date column in a table because they are linked in the presentation of the columns (e.g., an indication such as a graphical icon) or because they are linked in functionality based on logical rules (e.g., automations). Inspecting preexisting linkages may be limited to preexisting columns in a single or in multiple tables associated with one or more workplaces or users, or preexisting columns in tables of a certain type (e.g., a particular structure, a particular industry designation, or shared common row or column designations). Alternatively, all of the tables in a platform may be inspected. Generating the correlation index may include storing, in a repository, the preexisting columns and associated logical rules that were inspected in preexisting tables, as discussed above. Such storing may involve storing tags to linked data, storing linkages, or storing the complete data. Generating the correlating index may include storing every association of logical rules with columns, or applying a statistical measure to the likelihood of correlation. For example, the system may generate a likelihood of association between columns and logical rules through a score, percentage, or any other metric that may be determined as a result of inspecting preexisting linkages between preexisting columns and at least some of the plurality of logical rules. For example, if a certain logical rule has been linked to a certain column type or linked column types at a high frequency, the logical rule may receive a high score with respect to that column type. In some embodiments, generating the correlation index may include associating a logical rule with a column type in the correlation index if the score and/or percentage (i.e., the percentage of columns of the same column type that are linked to the logical rule) with respect to the column type meets or exceeds a certain threshold. Conversely, in some embodiments, generating the correlation index may also include disassociating a logical rule with a column type at a time when the score and/or percentage with respect to the column type falls below a certain threshold. Inspecting preexisting linkages between preexisting columns and at least some of the plurality of logical rules and generating the correlation index may occur on an instantaneous basis, on a periodical basis, or on a continuous basis.

In some embodiments, inspecting preexisting linkages may involve the use of artificial intelligence (as described in more detail throughout this disclosure with reference to machine learning and/or artificial intelligence) to analyze relationships between preexisting columns and at least some of the plurality of rules. Artificial intelligence may integrate one or more methods such as brain simulation, symbol manipulation, cognitive simulation, logic-based algorithms, anti-logic or scruffy approaches, knowledge-based approaches, sub-symbolic approaches, embodied intelligence, computational intelligence, soft computing, statistical approaches, or any other approach that may be integrated to establish one or more cognitive capabilities of a system architecture, such as reasoning, problem solving, knowledge representation, planning, learning, natural language processing, perception, motion and manipulation, social intelligence, general intelligence, or any other form of simulated intelligence. Such artificial intelligence methods may be used to inspect preexisting linkages between preexisting columns and at least some of the plurality of rules, which may further be utilized to generate the correlation index.

By way of example, correlation index 17 may be generated and/or maintained based on the inspection of one or more tables (e.g., table 1500 in FIG. 15) associated with disclosed embodiments. In table 1500, there may be preexisting linkages between at least some of the columns and at least some of the plurality of logical rules. For example, rule 1712 in FIG. 17 may be linked to status column 1502 such that when all of the statuses in status column 1502 have a status of "done", an individual is notified. Upon inspecting table 1500 alone or together with a plurality of other tables, it may be determined that rule 1712 is typically associated with status column type 1710, and correlation index 1700 may be generated or updated to reflect this association. In some embodiments, additional artificial intelligence methods may be used to generate correlation index 1700. The determination may, for example, be made through the use of artificial intelligence by assigning a score to logical rule 1712 with respect to status column type 1710 based on an analysis of a large amount of data relating to a plurality of tables. The correlation index may be, for example, preestablished, preestablished and periodically updated, preestablished and updated each time a new lookup is performed, or established on the fly each time a new lookup is performed.

In some embodiments, a correlation index may be a universal correlation index used across a plurality of tables, or it may be a correlation index that is particular to one table or a limited number of tables. For example, some disclosed embodiments may include customizing the correlation index to the maintained table based at least in part on other column types in the maintained table. Customizing the correlation index may include adding, removing, rearranging, or modifying rules based on the types of columns that exist within the maintained table. In one example, if a table does not include a status column type, the correlation index associated with the table may be customized to not include logical rules including conditions or table actions associated with a status or status change. In another example, a status column may be added to a table that previously did not contain a status column, and accordingly the correlation index associated with the table may be customized or otherwise updated to include logical rules including conditions or table actions associated with a status or status change.

By way of example, with reference to FIG. 15 and FIG. 17, suppose table 1500 is modified such that status column 1502 is removed. In this example, correlation index 1700 may be customized by removing all rules associated with status column type 1710 (e.g., rule 1712, rule 1714, rule 1716, rule 1718, etc.).

In some embodiments, the correlation index may be based on correlations previously employed by an entity associated with the new column. An entity associated with the new column may include any user associated with a table, such as a table owner or any other individual or entity (e.g., a particular device, a team, a company, or any other entity) with access rights to the table. As discussed above, logical rules may be included in the correlation index based on a score, percentage, or any other metric that may be determined as a result of inspecting preexisting linkages between preexisting columns and at least some of the plurality of logical rules. In some embodiments, however, including logical rules in the correlation index may be based on a score, percentage, or any other metric related to the entity's usage of said rule with respect to a certain column type. For example, if an entity frequently uses a rule that notifies an individual when a certain status changes, the correlation index may include an association between the rule and the status column type. Thus, in some embodiments, a correlation index may be associated with and personalized for a single entity.

By way of example, a user may add a new column to table 1500 in FIG. 15 by selecting the new column icon 1518 ("+"), and the user selects a "date" column type for the new column. Accordingly, the logical rules included in the correlation index may be based on this usage as a past usage of the logical rules by the user with respect to the new column type in the future when the user adds that particular column type.

In some embodiments, the correlation index is based on correlations previously employed by entities subscribed to the maintained table. An individual subscribed to the maintained table may refer to any entity or user with access or viewing rights to the maintained table. As discussed above, a correlation index may be associated with the maintained table and personalized based on any and/or all entities subscribed to the table. In some embodiments, however, a correlation index may be associated with a table and may be personalized based on past activity of entities subscribed to the maintained table. For example, if multiple entities frequently use a rule that notifies an individual when a certain status changes, the correlation index may include an association between the rule and the status column type.

In FIG. 15, a user may add a new column to table 1500 by selecting the new column icon 1518 ("+") and selecting a "date" column type for the new column. Accordingly, the logical rules included in the correlation index may be based on a past usage of the logical rules by any and/or all entities subscribed to the maintained table with respect to the new column type.

Aspects of this disclosure may involve a correlation index that may include rules customized to identify individuals subscribed to the maintained table. Rules customized to identify individuals subscribed to the maintained table may refer to rules that may determine the identity of particular individuals or client devices associated with particular individuals. For example, John Doe may be a supervisor associated with a maintained table, and a rule customized to identify John Doe may, when linked to the table, determine a specific client device associates with John Doe so that the system may send a notification or complete any action specific to John Doe or John Doe's client device. For example, the system may notify John Doe when the status of one or more cells changes to "complete" and the system identifies that the changed cell is associated with John Doe.

By way of example, referring to FIG. 17, logical rule 1724 delineates that "when date arrives notify someone." Logical rule 1724, however, may be customized to identify individuals subscribed to the maintained table and may delineate that "when date arrives notify John Doe."

Disclosed embodiments may include receiving a selection of a new column to be added to the table, and in response to the received selection, perform a look up in the correlation index for logical rules typically associated with a type of the new column. A new column may be selected through a user interface. For example, a user may select a new column icon, and may be presented with a pick list of column types that when selected, adds the selected column to the table. In some embodiments the type of the new column is defined by a heading of the new column. A heading of the new column may include a label associated with the new column to identify or define the information associated with the new column. This heading may be presented and selected as discussed above. Once the selection has been received, a look up for logical rules associated with a type of the new column may be performed by accessing the correlation index.

Figure 18:
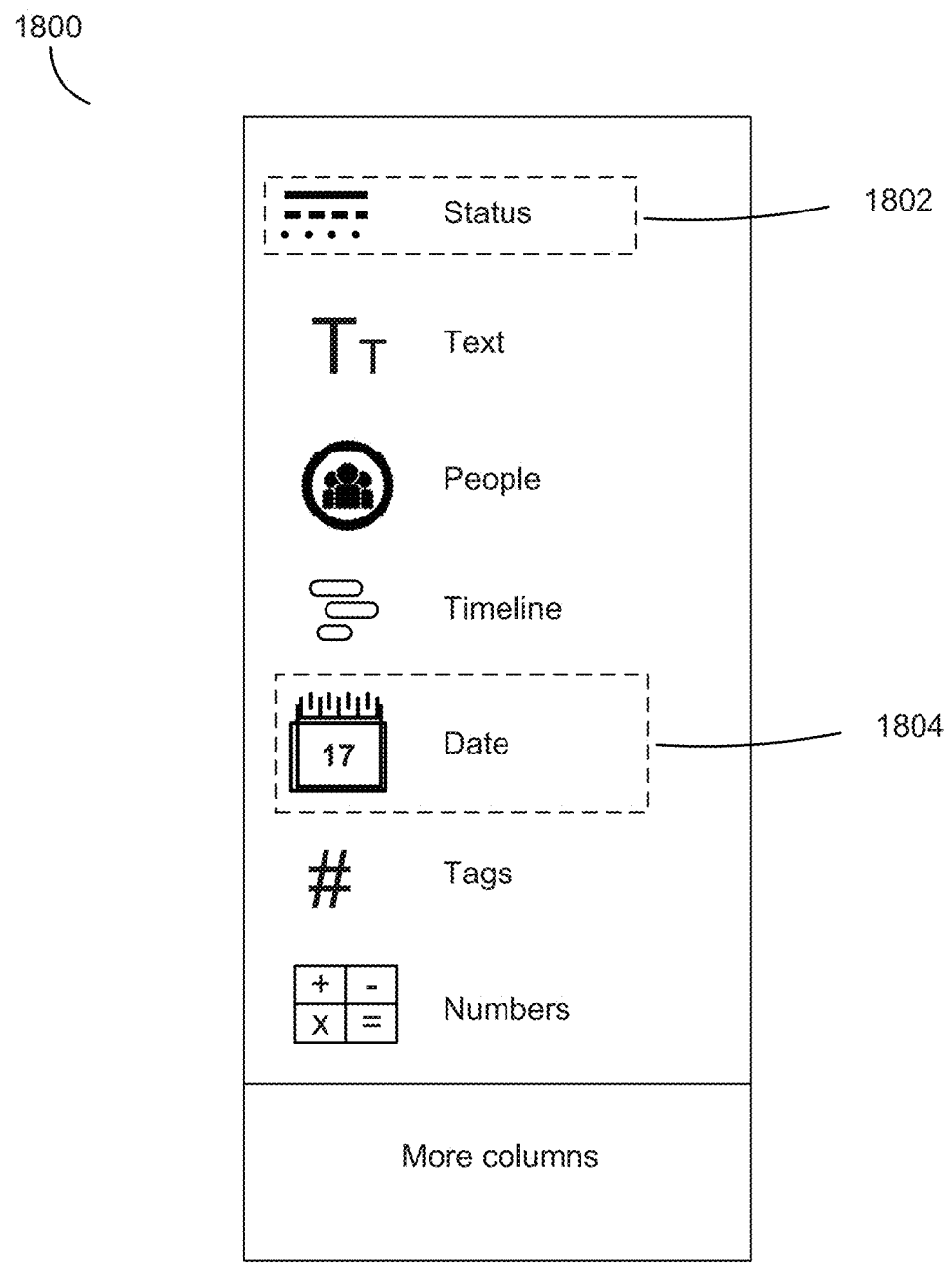
FIG. 18 illustrates a pick list of column types for a new column in a table, consistent with some embodiments of the present disclosure.

By way of example, FIG. 18 illustrates a pick list 1800 of column types for a new column in a table, consistent with some embodiments of the present disclosure. Pick list 1800 may be presented via a user interface (e.g., on user device 220-1, user device 220-2, user device 220-m, etc. in FIG. 2) based on a user selecting new column icon 1518 in FIG. 15. Pick list 1800 may include a plurality of column types for selection by the user, such as status column type 1802 and date column type 1804. Once a column type is selected, a column of that column type may be added to the table, and the column type may be defined by a heading of the new column. For example, the column types of status column 1502 and due date column 1508 may be defined by heading 1504 and heading 1508, respectively.

Disclosed embodiments may include presenting a pick list of the logical rules typically associated with the type of the new column. A pick list may include a limited or unlimited list of options that may be selected, or it may refer to any form of interface suitable for enabling users to select one or more options from a selection of options. By way of some non-limiting examples, a pick list may include different logical rules that are associated with the type of the new column and may be selectable by a user, such as a notification rule, a data change rule, or an archiving rule. In some embodiments, a pick list may include all the logical rules in the correlation index that are associated with the new column. However, the pick list may also only include a limited number of logical rules. For example, some disclosed embodiments may include ranking the logical rules in the correlation index with respect to each column type and presenting only the top ranked logical rules in the pick list (e.g., top 3). The ranking may be based on scores, percentages, or other metrics of the logical rules with respect to certain column types, which may be based on total usage across all tables, individual table usage, individual entity usage, or any other usage metrics.

Figure 19:
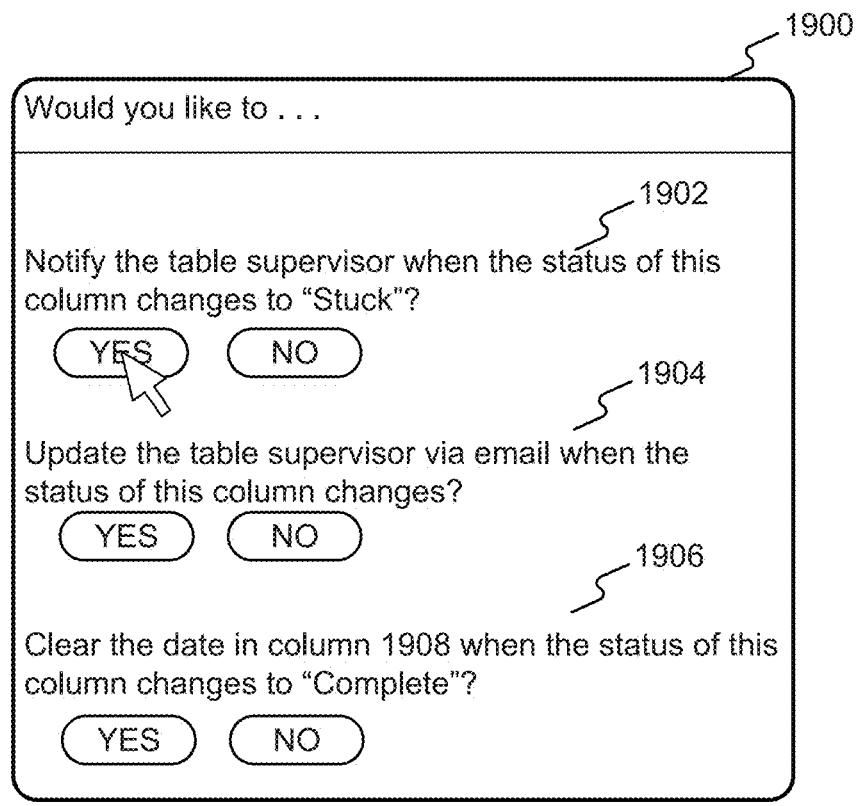
FIG. 19 illustrates an exemplary pick list for selecting one of a plurality of logical rules, consistent with some embodiments of the present disclosure.

FIG. 19 illustrates an exemplary pick list 1900 for selecting one of a plurality of logical rules, consistent with some embodiments of the present disclosure. Pick list 1900 may be displayed on a graphical user interface (e.g., on user device 220-1, user device 220-2, user device 22-m in FIG. 2). Pick list 1900 may present as suggestions rule 1902, rule 1904, and rule 1906 that may be selected by the user by clicking "YES" or may be declined by the user by clicking "NO." In some embodiments, a list may be provided without a "YES"/"No" option, but rather that enables selection simply by clicking on a listed rule. Rule 1902, rule 1904, and rule 1906 may be all of the logical rules associated with the selected column type in the correlation index, or they may be the top ranked logical rules in a larger number of rules in the correlation index.

Some embodiments may include permitting alteration to the correlation index to remove suggestions. Alteration to the correlation index may include the addition, removal, rearrangement, or modification of logical rules from the pick list. Altering the correlation index to remove suggestions may include the removal or obfuscation of logical rules from the correlation index and the pick list, or a presentation indicating that the logical rule for removal should not be presented with respect to a certain column type. In some embodiments, altering the correlation index to remove suggestions may include modifying settings or parameters associated with the correlation index so that it no longer includes logical rules similar to the removed suggestions. Permitting alteration may refer to granting a user access rights to the user such that the user can modify the correlation index. In some embodiments, alteration to the correlation index can occur automatically based on a user selecting or declining a presented suggestion.

By way of example, a user may be granted access rights to correlation index 1700 in FIG. 17 such that the user can modify correlation index 1700. For example, a user with access may remove rule 1724 so that it is no longer presented (e.g., on pick list 1900 in FIG. 19 as a suggestion). In another example, rule 1902 may be declined when the user selects "NO" in FIG. 19, which may cause rule 1902 from being removed from a search index.

Disclosed embodiments may include receiving a selection from a pick list and linking to a new column a second particular logical rule associated with the selection from the pick list. Receiving a selection may include receiving one or more inputs indicating that a user has selected a particular second logical rule from the pick list. The selection may be achieved through any suitable user interface (e.g., a mouse, keyboard, touchscreen, microphone). Some nonlimiting examples of inputs may include a clicking the logical rule, clicking a button associated with the logical rule, touching the logical rule on a touch screen, or a verbal confirmation that the logical rule has been selected. Once the selection is received, the selected second logical rule may be linked to the new column.

By way of example, referring to FIG. 19, a user may select one of the logical rules on pick list 1900. For example, the user may select logical rule 1902 from pick list 1900 by clicking on the "YES" icon associated with logical rule 1902.

Some embodiments may include implementing a second particular logical rule when data in a new column meets a condition of the second particular logical rule. Implementing a second particular logical rule may be similar to implementation of the first logical rule, as discussed above and may refer to executing a table action associated with the second particular logical rule once data in the new column meets a condition. For example, if the new column is a status column, and the second particular logical rule is to clear a due date (i.e., a table action) when a corresponding status in a status column is "done" (i.e., meeting a condition), then implementing the second particular logical rule may include clearing the due date when the status turns to "done." Some embodiments may include applying the second particular logical rule to at least one cell in the new column when the particular logical rule is linked to the new column. In these embodiments, it can be said that the selected logical rule is automatically applied or associated to one or more cells of a new column upon being linked to the new column. As soon as the selected logical rule is applied to a new column and its cells, the selected logical rule may automatically execute operations as soon as conditions are met. For example, a selected logical rule for a new status column may be to change the status in the column to "overdue" if a date in a corresponding date column has passed. If the due date has passed when the logical rule is linked to the column, the linked logical rule will be applied such that the corresponding cell in the new status column will have a status of "overdue."

By way of a non-limiting example, referring to FIGS. 15 and 19, assume status column 1502 is a new column where a user has selected logical rule 1902 from pick list 1900, thereby linking logical rule 1902 to status column 1502. Logical rule 1902 may be implemented such that if the top cell of status column 1502 changes from "In Progress" to "Stuck," a table supervisor will be notified. Logical rule 1902 may also be applied at the time when it is linked to status column 1502 such that a table supervisor is notified immediately due to the status of the middle cell in status column 1502 being "Stuck."

Figure 20:
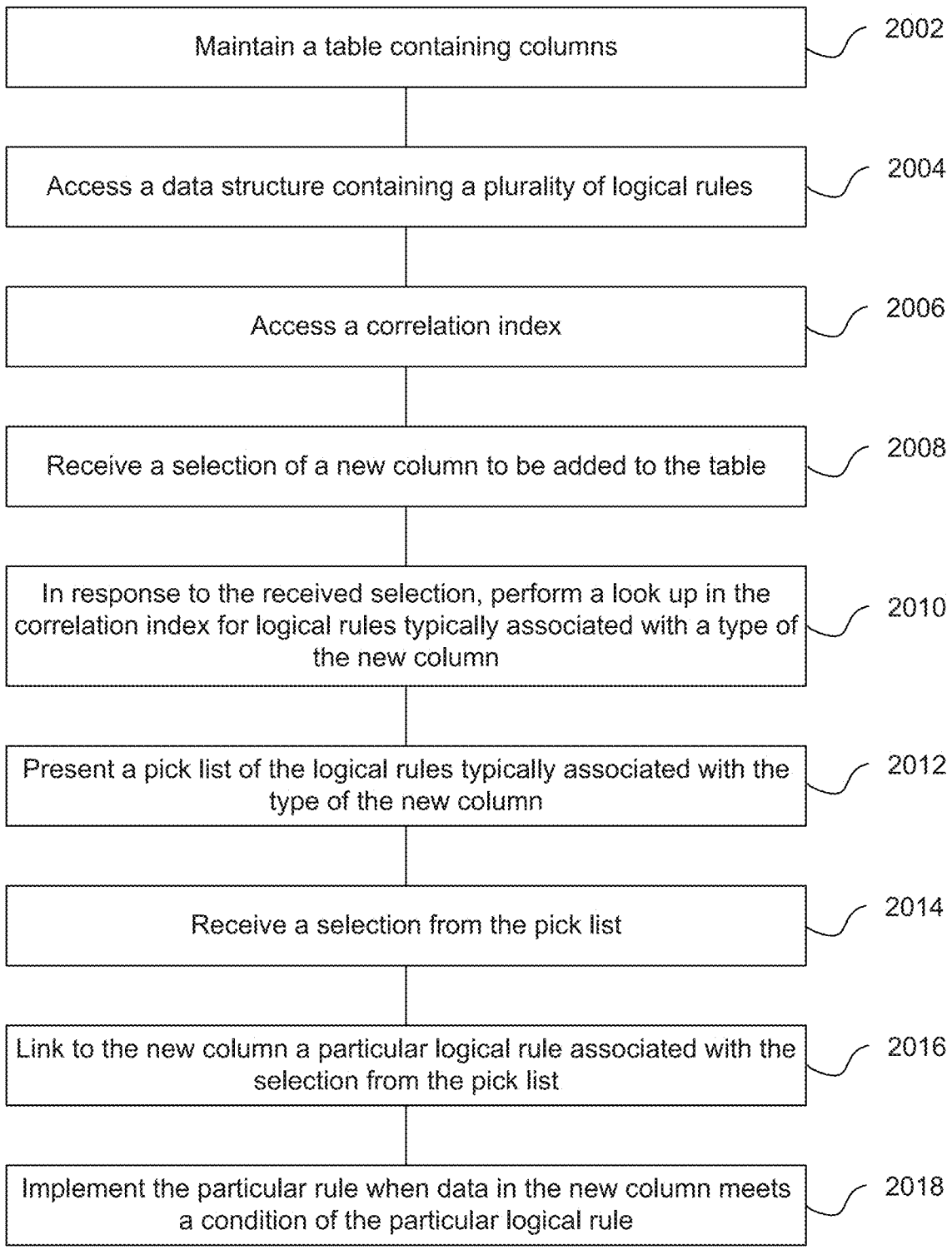
FIG. 20 illustrates a block diagram of an example process for associating a plurality of logical rules with groupings of data, consistent with some embodiments of the present disclosure.

FIG. 20 illustrates a block diagram of an example process 2000 for associating a plurality of logical rules with groupings of data. While the block diagram may be described below in connection with certain implementation embodiments presented in other figures, those implementations are provided for illustrative purposes only, and are not intended to serve as a limitation on the block diagram. In some embodiments, the process 2000 may be performed by at least one processor (e.g., the processing circuitry 110 in FIG. 1) of a computing device (e.g., the computing device 100 in FIGS. 1 and 2) to perform operations or functions described herein and may be described hereinafter with reference to FIGS. 15 to 19 by way of example. In some embodiments, some aspects of the process 2000 may be implemented as software (e.g., program codes or instructions) that are stored in a memory (e.g., the memory portion 122 in FIG. 1) or a non-transitory computer-readable medium. In some embodiments, some aspects of the process 2000 may be implemented as hardware (e.g., a specific-purpose circuit). In some embodiments, the process 2000 may be implemented as a combination of software and hardware.

FIG. 20 includes process blocks 2002 to 2018. At block 2002, a processing means (e.g., any type of processor described herein or that otherwise performs actions on data) may maintain a table containing columns, consistent with some embodiments of the present disclosure.

At block 2004, the processing means may access a data structure containing a plurality of logical rules. The logical rules may, when linked to columns, enable a table action in response to a condition change in a cell associated with a particular logical rule linked to a particular column, as discussed previously in the disclosure above.

At block 2006, the processing means may access a correlation index. The correlation index may identify a plurality of column types and a subset of the plurality of logical rules typically associated with each column type, as discussed previously in the disclosure above.

At block 2008, the processing means may receive a selection of a new column to be added to the table, as discussed previously in the disclosure above.

At block 2010, the processing means may, in response to the received selection, perform a look up in the correlation index for logical rules typically associated with a type of the new column, as discussed previously in the disclosure above.

At block 2012, the processing means may present a pick list of the logical rules typically associated with the type of the new column, as discussed previously in the disclosure above.

At block 2014, the processing means may receive a selection from the pick list, as discussed previously in the disclosure above.

At block 2016, the processing means may link to the new column a particular logical rule associated with the selection from the pick list, as discussed previously in the disclosure above.

At block 2018, the processing means may implement the particular rule when data in the new column meets a condition of the particular logical rule, as discussed previously in the disclosure above.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

- maintaining a table;
- presenting to an entity a plurality of tools for manipulating data in the table;
- monitoring tool usage by the entity to determine at least one tool historically used by the entity;
- comparing the at least one tool historically used by the entity with information relating to the plurality of tools to thereby identify at least one alternative tool in the plurality of tools whose substituted usage is configured to provide improved performance over the at least one historically used tool;
- presenting to the entity during a table use session a recommendation to use the at least one alternative tool;
- wherein presenting includes providing the entity with an identification of the improved performance;
- presenting the at least one alternative tool at a time when the entity accesses the at least one historically used tool;
- wherein comparing includes performing semantic analysis of the table to identify a table context, and wherein the at least one alternative tool is identified at least in part on the table context;
- wherein the table context is at least one of a field, vocation, task, or function;
- identifying an instance where a specific recommendation is declined, and is thereafter further configured to disable future presentation of the specific recommendation;
- wherein the recommendation includes information about a tool newly added to the plurality of tools;
- wherein monitoring tool usage includes monitoring a count of each instance each tool is used;
- wherein monitoring tool usage includes monitoring combinations of the at least one tool historically used by the entity;
- maintaining a list of restricted tools, and is further configured to withhold a recommendation to a use a tool when the tool is on the restricted list;
- outputting a logical sentence structure template for use in building a new application module, the logical sentence structure template including a plurality of definable variables that when selected result in a logical sentence structure delineating a function of the new application module;
- receiving at least one input for at least one of the definable variables;
- performing language processing on the logical sentence structure including the at least one received input to thereby characterize the function of the new application module;
- comparing the characterized function of the new application module with pre-stored information related to a plurality of predefined application modules to determine at least one similarity to a specific predefined application module;

based on the at least one similarity, presenting the specific predefined application module as an adoptable alternative for accomplishing the function;
performing language processing on the logical sentence structure before less than all of the variables of the logical sentence structure are selected;
wherein the language processing is performed on the logical sentence structure before less than all of the plurality of variables are input;
wherein the function is estimated based on less than an input of all the variables;
wherein the characterization of the function of the new application module is generated before all of the plurality of variables are selected;
wherein the language processing on the logical sentence structure includes identifying function-related words used in the logical sentence structure;
wherein the language processing involves artificial intelligence for determining an objective of the logical sentence structure;
wherein the at least one similarity includes at least one of a similarity in a word or an objective;
wherein the characterization of the function of the new application module includes examination of a table associated with the logical sentence structure;
maintaining a table containing columns;
accessing a data structure containing the plurality of logical rules including a first particular logical rule that when linked to a first particular column, enables a table action in response to a condition change in a cell associated with the first particular logical rule linked to the first particular column;
accessing a correlation index identifying a plurality of column types and a subset of the plurality of logical rules typically associated with each column type;
receiving a selection of a new column to be added to the table;
in response to the received selection, performing a look up in the correlation index for logical rules typically associated with a type of the new column;
presenting a pick list of the logical rules typically associated with the type of the new column;
receiving a selection from the pick list;
linking to the new column a second particular logical rule associated with the selection from the pick list;
implementing the second particular logical rule when data in the new column meets a condition of the second particular logical rule;
wherein each of the plurality of logical rules includes a logical sentence structure;
wherein when the second particular logical rule is linked to the new column, applying the second particular logical rule to at least one cell in the new column;
wherein the table action includes a change in data in the maintained table or in another table;
wherein the condition change in a cell includes a change of data in the cell;
wherein the correlation index is stored in the data structure;
wherein the type of the new column is defined by a heading of the new column;
generating the correlation index by inspecting preexisting linkages between preexisting columns and at least some of the plurality of logical rules;
customizing the correlation index to the maintained table based at least in part on other column types in the maintained table;
wherein the correlation index is based on correlations previously employed by an entity associated with the new column;
wherein the correlation index is based on correlations previously employed by entities subscribed to the maintained table;
wherein the correlation index includes rules customized to identify individuals subscribed to the maintained table;
permitting alteration to the correlation index to remove suggestions.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for self-monitoring software usage to optimize performance, the system comprising:
   at least one processor configured to:
   maintain a table;
   present to an entity a plurality of tools for manipulating data in the table;
   monitor tool usage by the entity to determine at least one tool historically used by the entity;
   compare the at least one tool historically used by the entity with information relating to the plurality of tools to thereby identify at least one alternative tool in the plurality of tools whose substituted usage is configured to provide improved performance over the at least one historically used tool, wherein the comparing includes performing semantic analysis of the table to identify a table context and wherein the at least one alternative tool is identified at least in part on the table context; and
   present to the entity during a table use session a recommendation to use the at least one alternative tool.

2. The system of claim 1, wherein presenting includes providing the entity with an identification of the improved performance.

3. The system of claim 1, wherein the at least one processor is further configured to present the at least one alternative tool at a time when the entity accesses the at least one historically used tool.

4. The system of claim 1, wherein the table context is at least one of a field, vocation, task, or function.

5. The system of claim 1, wherein the at least one processor is further configured to identify an instance where a specific recommendation is declined, and is thereafter further configured to disable future presentation of the specific recommendation.

6. The system of claim 1, wherein the recommendation includes information about a tool newly added to the plurality of tools.

7. The system of claim 1, wherein monitoring tool usage includes monitoring a count of each instance each tool is used.

8. The system of claim 1, wherein monitoring tool usage includes monitoring combinations of the at least one tool historically used by the entity.

9. The system of claim 1, wherein the at least one processor is further configured to maintain a list of restricted tools and is further configured to withhold a recommendation to a use a tool when the tool is on the restricted list.

10. A non-transitory computer readable medium containing instructions that when executed by at least one processor, cause the at least one processor to perform operations for self-monitoring software usage to optimize performance, the operations comprising:
    maintaining a table;
    presenting to an entity a plurality of tools for manipulating data in the table;
    monitoring tool usage by the entity to determine at least one tool historically used by the entity;
    comparing the at least one tool historically used by the entity with information relating to the plurality of tools to thereby identify at least one alternative tool in the plurality of tools whose substituted usage is configured to provide improved performance over the at least one historically used tool, wherein the comparing includes performing semantic analysis of the table to identify a table context and wherein the at least one alternative tool is identified at least in part on the table context; and
    presenting to the entity during a table use session a recommendation to use the at least one alternative tool.

11. The non-transitory computer readable medium of claim 10, wherein presenting includes providing the entity with an identification of the improved performance.

12. The non-transitory computer readable medium of claim 10, wherein the operations further comprise presenting the at least one alternative tool at a time when the entity accesses the at least one historically used tool.

13. The non-transitory computer readable medium of claim 10, wherein the table context is at least one of a field, vocation, task, or function.

14. The non-transitory computer readable medium of claim 10, wherein the operations further comprise identifying an instance where a specific recommendation is declined, and disabling future presentation of the specific recommendation.

15. The non-transitory computer readable medium of claim 10, wherein the operations further comprise maintaining a list of restricted tools and is further configured to withhold a recommendation to a use a tool when the tool is on the restricted list.

16. A method for self-monitoring software usage to optimize performance, the operations comprising:
    maintaining a table;
    presenting to an entity a plurality of tools for manipulating data in the table;
    monitoring tool usage by the entity to determine at least one tool historically used by the entity;
    comparing the at least one tool historically used by the entity with information relating to the plurality of tools to thereby identify at least one alternative tool in the plurality of tools whose substituted usage is configured to provide improved performance over the at least one historically used tool, wherein the comparing includes performing semantic analysis of the table to identify a table context and wherein the at least one alternative tool is identified at least in part on the table context; and
    presenting to the entity during a table use session a recommendation to use the at least one alternative tool.

17. The method of claim 16, wherein monitoring tool usage includes monitoring a count of each instance each tool is used.

18. The method of claim 16, wherein monitoring tool usage includes monitoring combinations of the at least one tool historically used by the entity.

19. A system for self-monitoring software usage to optimize performance, the system comprising:
    at least one processor configured to:
        maintain a table;
        present to an entity a plurality of tools for manipulating data in the table;
        monitor tool usage by the entity to determine at least one tool historically used by the entity;
        compare the at least one tool historically used by the entity with information relating to the plurality of tools to thereby identify at least one alternative tool in the plurality of tools whose substituted usage is configured to provide improved performance over the at least one historically used tool; and
        present to the entity during a table use session a recommendation to use the at least one alternative tool, wherein the at least one processor is further configured to maintain a list of restricted tools and is further configured to withhold a recommendation to a use a tool when the tool is on the restricted list.

20. The system of claim 19, wherein presenting includes providing the entity with an identification of the improved performance.

21. The system of claim 19, wherein the at least one processor is further configured to present the at least one alternative tool at a time when the entity accesses the at least one historically used tool.

* * * * *